(12) United States Patent
Aamodt et al.

(10) Patent No.: US 11,279,439 B1
(45) Date of Patent: Mar. 22, 2022

(54) BICYCLE TRAILER AND MOUNT FOR COUPLING AN ACCESSORY SUPPORT ARM TO THE TRAILER

(71) Applicant: Burley Design LLC, Eugene, OR (US)

(72) Inventors: Evan Aamodt, Philadelphia, PA (US); Andrew J. Miller, Phoenixville, PA (US); Erin H. Morrissey, Mont Claire, PA (US); Scott Spence, Eugene, OR (US); Jonathan Anderegg, Eugene, OR (US); Matthew Downing, Eugene, OR (US)

(73) Assignee: Burley Design LLC, Eugene, OR (US)

( * ) Notice: Subject to any disclaimer, the term of this patent is extended or adjusted under 35 U.S.C. 154(b) by 358 days.

(21) Appl. No.: 16/392,419

(22) Filed: Apr. 23, 2019

Related U.S. Application Data

(60) Provisional application No. 62/694,398, filed on Jul. 5, 2018.

(51) Int. Cl.
   *B62K 27/12* (2006.01)
   *B62K 27/00* (2006.01)
   *B62K 27/02* (2006.01)

(52) U.S. Cl.
   CPC ............ *B62K 27/12* (2013.01); *B62K 27/003* (2013.01); *B62K 27/02* (2013.01)

(58) Field of Classification Search
   CPC ....... B62K 27/02; B62K 27/003; B62K 27/12
   USPC ......................................................... 280/204
   See application file for complete search history.

(56) References Cited

U.S. PATENT DOCUMENTS

| | | | |
|---|---|---|---|
| 2008/0067787 A1* | 3/2008 | Britton | B62B 7/12 280/643 |
| 2012/0200059 A1* | 8/2012 | Rodgers | B62K 27/006 280/204 |
| 2017/0361860 A1 | 12/2017 | Fleming et al. | |

FOREIGN PATENT DOCUMENTS

CA       2208809       6/1998

OTHER PUBLICATIONS

Leggero Vento R Manual; prior to Jul. 4, 2017; 20 pages.
Photos of a plastic receiver; offered for sale and sold in 2009; 2 pages.
Drawings of a plastic receiver; offered for sale and sold in 2016; 2 pages.

* cited by examiner

*Primary Examiner* — Tony H Winner
*Assistant Examiner* — Felicia L. Brittman
(74) *Attorney, Agent, or Firm* — Klarquist Sparkman, LLP

(57) ABSTRACT

A bracket, which can be in the form of first and second bracket members, desirably projects outwardly from the trailer frame and includes a bracket passageway. A housing includes a housing passageway extending at least partially through the housing and that communicates with the exterior of the housing through a locking insert receiving opening. The locking insert receiving opening, the housing passageway and the bracket passageways define a locking insert receiving passageway. A locking insert couples the housing to the bracket and thereby to the trailer frame. The locking insert includes an accessory arm receiving passageway communicating with the housing exterior through the locking insert receiving opening.

26 Claims, 9 Drawing Sheets

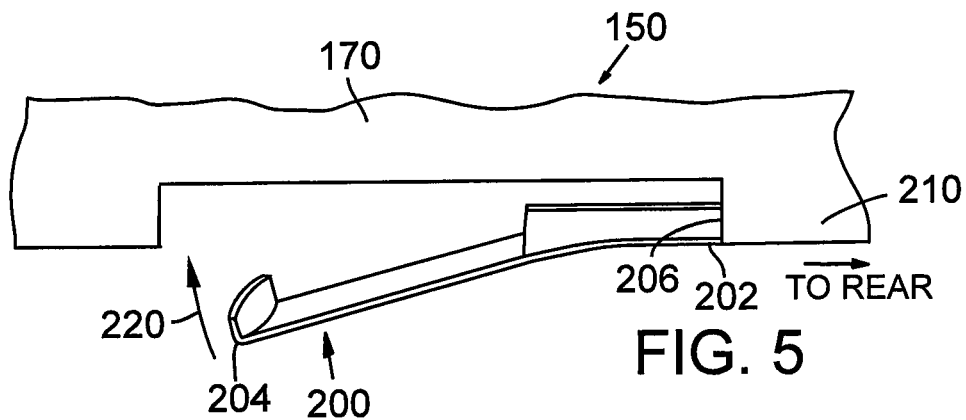
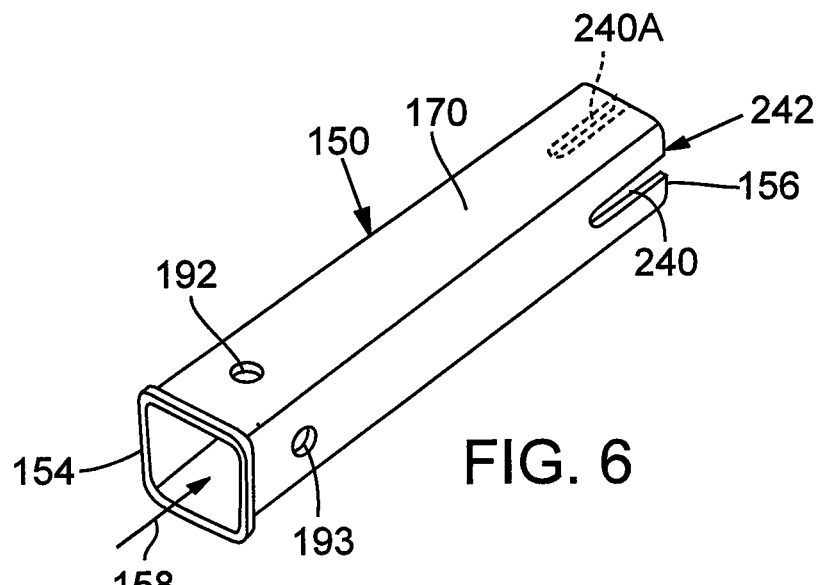
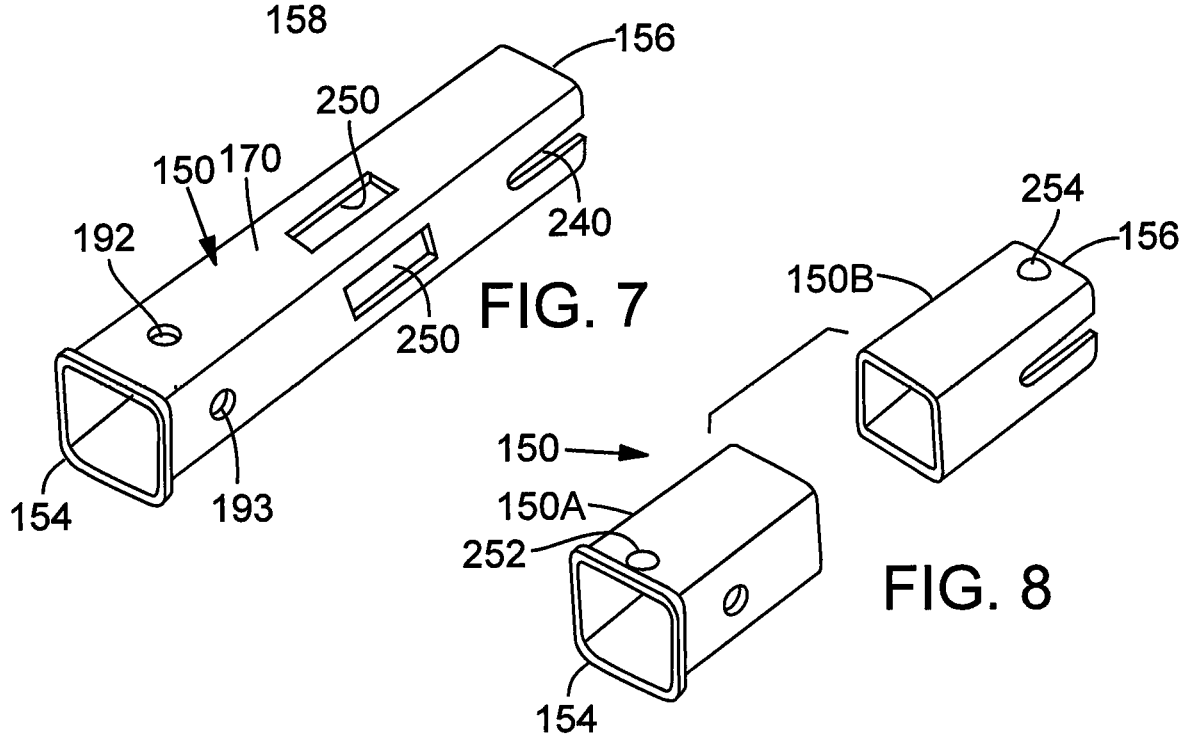

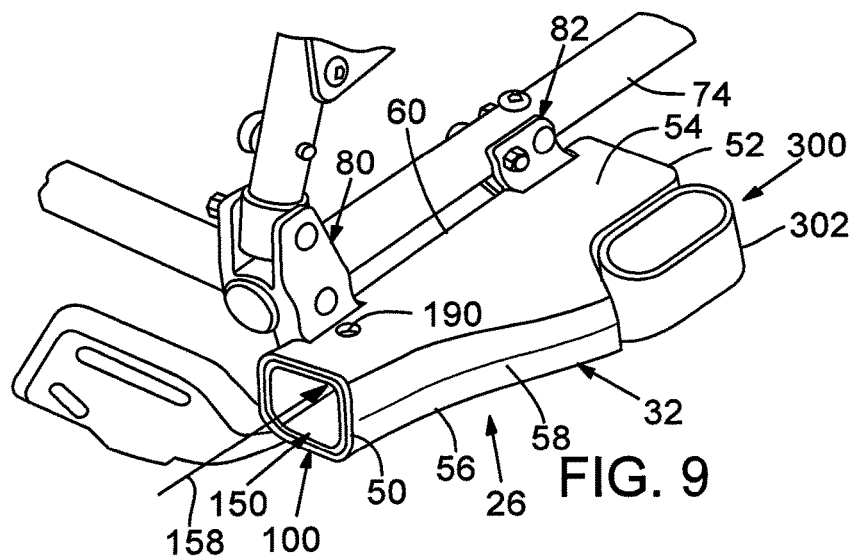
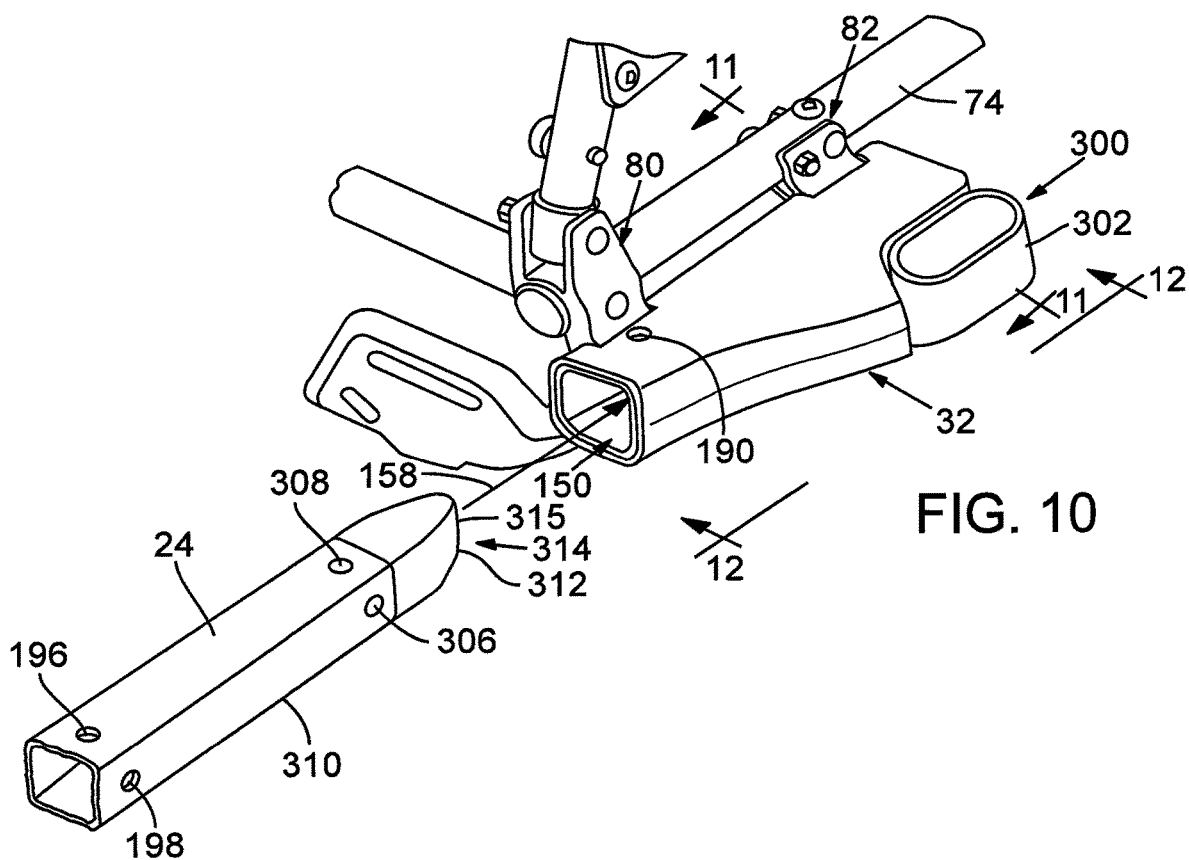

BICYCLE TRAILER AND MOUNT FOR COUPLING AN ACCESSORY SUPPORT ARM TO THE TRAILER

CROSS REFERENCE TO RELATED APPLICATION

This application claims the benefit of U.S. Provisional Application Ser. No. 62/694,398, entitled BICYCLE TRAILER AND MOUNT FOR COUPLING AN ACCESSORY SUPPORT ARM TO THE TRAILER, filed on Jul. 5, 2018, which is incorporated by reference herein.

FIELD

This disclosure relates to bicycle trailers with a coupling mechanisms for coupling an accessory supporting arm to the bicycle trailer.

SUMMARY

In accordance with an embodiment of this disclosure, a bicycle trailer comprises a trailer frame. A bracket is coupled to the trailer frame and desirably projects outwardly from the trailer frame, such as from a side frame member of the frame. The bracket can comprise first and second spaced apart discrete bracket members. The bracket can comprise a bracket passageway that desirably extends in a front to rear direction along a side of the trailer frame. A housing can be coupled to the bracket and thereby to the trailer frame. The housing can comprise a housing exterior and a housing passageway extending at least partially through the housing with the housing passageway communicating with the exterior of the housing through a locking insert receiving opening. The locking insert receiving opening, the housing passageway and the bracket passageways can define a locking insert receiving passageway. A locking insert can be positioned at least partially within the locking insert receiving passageway and extending at least partially through the bracket passageway and the housing passageway to thereby couple the housing to the bracket and to the trailer frame. The locking insert can comprise an accessory arm receiving passageway communicating with the housing exterior through the locking insert receiving opening.

In accordance with another aspect of this disclosure an accessory arm supporting mount is provided for coupling to a trailer frame, such as by one or more brackets carried by the frame. The mount comprises a housing defining a housing passageway that receives an insert. The insert being operable to couple the housing to the one or more brackets. The insert having an insert passageway that receives the accessory supporting arm. The mount desirably comprising a lock operable to selectively retain the arm in position in the passageway.

In accordance with another aspect of the disclosure, the trailer frame can comprise a side frame member extending in a front to rear direction along a first side of the bicycle trailer. A bracket can comprise first and second bracket members coupled to the first side frame member and projecting outwardly from the first frame member, the first bracket member comprising a first bracket passageway and the second bracket member comprising a second bracket passageway. A housing can be coupled to the first and second bracket members and thereby to the first side frame member. The housing can comprise a housing exterior, a housing interior, a housing front, a housing rear and first and second housing sides. The housing can also comprise a locking insert receiving opening that communicates with the exterior of the housing and a housing passageway extending at least partially through the housing interior from the locking insert receiving opening. The first and second bracket passageways can be aligned with one another and also aligned with the locking insert receiving opening and the housing passageway. The locking insert receiving opening, the housing passageway and the first and second bracket passageways together can define a locking insert receiving passageway. A locking insert can be positioned in the locking insert receiving passageway and extending at least partially through each of the first and second bracket passageways, and the housing passageway, so as to couple the housing to the first and second bracket members and thereby to the first frame side member. The locking insert can comprise an accessory arm receiving passageway communicating with the housing exterior through the locking insert receiving opening.

As another aspect of the disclosure, the locking insert can comprise a locking sleeve that comprises a locking sleeve body comprising a front portion positioned in the first bracket passageway, a central portion positioned between the first and second bracket passageways and a rear portion positioned in the second bracket passageway.

As a further aspect of this disclosure, the locking insert comprises a locking sleeve comprising a front portion with a front end, wherein the locking sleeve front end has at least one cross sectional dimension that is greater than the cross sectional dimension of the locking insert receiving opening, the locking sleeve front end engaging the housing at the locking sleeve insert receiving opening to limit the depth of insertion of the locking sleeve body into the locking sleeve insert receiving passageway.

As a still further aspect of this disclosure, the locking sleeve can have a lip surrounding the locking sleeve front end, the cross-sectional dimension of the locking sleeve at the lip being greater than the cross-sectional dimension of the locking insert receiving opening.

As yet another aspect, the housing can comprise a housing front and a housing rear, wherein the housing passageway extends through the housing from the housing front to the housing rear, wherein the locking insert receiving opening is at the housing front, and wherein the locking sleeve extends approximately from the housing front to the housing rear.

As a still further aspect, the locking sleeve can comprise a rear end and a locking sleeve body, the locking sleeve further comprising at least one locking flange having a proximal end and a distal end, wherein the proximal end of the locking flange is pivoted to the locking sleeve body at first location of the locking sleeve body, wherein the distal end of the locking flange projects outwardly from the first location and away from the rear portion of the locking sleeve body, the housing having at least one locking flange engaging projection extending inwardly into the locking insert receiving passageway and positioned to engage the locking sleeve flange and pivot the locking flange distal end inwardly as the locking sleeve body is inserted locking sleeve rear end first through the locking insert receiving opening and into the locking insert receiving passageway, the locking flange engaging projection having a front projection portion and a rear projection portion, the distal end of the locking flange being positioned rearwardly of the rear projection portion and pivoting outwardly rearwardly of the rear projection portion upon insertion of the locking sleeve insert to a location that positions the distal end of the locking flange rearwardly of the rear projection portion, the rear projection portion engaging the distal end of the locking flange to block the removal of the locking sleeve from the housing through the locking insert receiving opening As another aspect, the housing passageway, the bracket passageway, locking insert receiving passageway, and the accessory arm receiving passageway can each have a rectangular cross section.

As a further aspect, the locking insert can comprise a first locking pin receiving opening positioned at a rear end portion of the locking insert, a first locking pin coupled to the housing and aligned with the first locking pin receiving opening, the locking pin being slidably coupled to the housing and movable between a first locking pin position in which the first locking pin extends through the first locking pin receiving opening into the accessory arm receiving passageway and a second locking pin position in which the first locking pin withdrawn from the accessory arm receiving passageway, a spring coupled to the housing and to the first locking pin that biases the first locking pin to the first locking pin position, and a handle coupled to the pin and slidably coupled to the housing, the handle being movable from a first handle position in which the first locking pin is in the first locking pin position to a second handle position in which the first locking pin is in the second locking pin position, the handle being coupled to the spring and biased by the spring to the first handle position.

As an aspect, an accessory supporting arm can have a front arm end portion and a rear arm end portion, the rear arm end portion comprising a rear arm portion distal end, the rear arm end portion being sized for insertion into the accessory arm receiving passageway, the rear arm end portion having a pin engaging surface that converges toward the first locking pin moving from a first location to a second location along the rear portion of the accessory supporting arm, the first location being nearer to the rear arm portion distal end of the accessory supporting arm than the second location, the rear arm end portion having a first accessory arm pin receiving opening positioned further from the rear arm portion distal end of the accessory supporting arm than the second location, the first accessory arm pin receiving opening being located so as to be aligned with the first locking pin receiving opening at one position of insertion of the rear arm end portion into the accessory arm receiving passageway, wherein as the rear arm end portion is inserted into the accessory arm receiving passageway the pin engaging surface engages the first locking pin and pushes the first locking pin against the force applied by the spring to the second locking pin position, and wherein at said one position of insertion of the rear arm end portion into the accessory arm receiving passageway, the spring biases the first locking pin to the first locking pin position, and wherein in the first locking pin position the first locking pin is biased by the spring into the first accessory arm pin receiving opening to thereby lock the accessory supporting arm to the housing.

As still another aspect, the accessory supporting arm can be rectangular with four sides and wherein one of said pin engaging surfaces and one of said first accessory arm pin receiving openings is located at each of the four sides of the accessory supporting arm.

As yet another aspect, the locking insert can comprise a first locking pin receiving opening positioned at a rear end portion of the locking insert, a first locking pin coupled to the housing and aligned with the first locking pin receiving opening, the locking pin being slidably coupled to the housing and movable between a first locking pin position in which the first locking pin extends through the first locking pin receiving opening into the accessory arm receiving passageway and a second locking pin position in which the first locking pin withdrawn from the accessory arm receiving passageway, a spring coupled to the housing and to the first locking pin that biases the first locking pin to the first locking pin position, a handle coupled to the pin and slidably coupled to the housing, the handle being movable from a first handle position in which the first locking pin is in the first locking pin position to a second handle position in which the first locking pin is in the second locking pin position, the handle being coupled to the spring and biased by the spring to the first handle position, and wherein the second bracket member is located rearwardly of the first bracket member and wherein the first locking pin receiving opening extends through the second bracket member.

As another aspect, the side frame member can comprise a first side member extending in a front to rear direction along a first side of the trailer, the trailer frame also comprising a second side frame member extending in a front to rear direction along a second side of the bicycle trailer opposite to the first side of the bicycle trailer, and wherein there is a second of the first and second bracket members coupled to the second side frame member, a second of said housings coupled to the first and second bracket members coupled to the second side frame member, and a second of said locking inserts coupling the second housing to said second of the first and second brackets and thereby to the second frame side member.

In accordance with an embodiment, an accessory mount is provided for coupling an accessory supporting arm to a bracket that is coupled to a portion of the frame of a bicycle trailer, the bicycle trailer having a front and a rear, and wherein the bracket comprises a bracket passageway. The accessory mount can comprise: a housing coupled to the bracket and thereby to the frame; wherein the housing comprises a housing exterior, a housing interior, a housing front, a housing rear and first and second housing sides, the housing comprising a locking insert receiving opening that communicates with the exterior of the housing and a housing passageway extending at least partially through the housing interior from the locking insert receiving opening and in a housing front to housing rear direction; wherein the bracket passageway is aligned with the locking insert receiving opening and the housing passageway; wherein the locking insert receiving opening, the housing passageway and the bracket passageway together define a locking insert receiving passageway; a locking insert positioned in the locking insert receiving passageway and extending at least partially through the bracket passageway, and the housing passageway, wherein the locking insert couples the housing to the bracket and thereby to the frame; and the locking insert comprising an accessory arm receiving passageway communicating with the housing exterior through the locking insert receiving opening.

In accordance with a further aspect, the bracket can comprise first and second bracket members with respective first and second bracket passageways, and wherein the housing comprises first and second bracket receiving openings, wherein a portion of the first bracket extends through the first bracket receiving opening and a portion of the second bracket extends through the second bracket receiving opening, wherein the first and second bracket passageways are positioned within the interior of the housing.

As another aspect, the bracket can comprise first and second bracket members with respective passageways, and wherein the housing comprises first and second bracket receiving openings communicating with the interior of the housing through one of the first and second housing sides, wherein first bracket receiving opening is sized for insertion of at least a portion of the first bracket therethrough to position the first bracket opening within the housing interior, wherein second bracket receiving opening is sized for insertion of at least a portion of the second bracket therethrough to position the first bracket opening within the housing interior.

As a further aspect, the locking insert can comprise a locking sleeve comprising a locking sleeve body comprising a front portion positioned in the first bracket passageway, a central portion positioned between the first and second bracket passageways and a rear portion positioned in the second bracket passageway.

As another aspect, the locking sleeve can have a front portion having a front end and a locking sleeve rear portion having a rear end, the locking sleeve front end can have at least one cross sectional dimension that is greater than the cross sectional dimension of the locking insert receiving opening, the locking sleeve front end can engage the housing at the locking sleeve receiving opening to limit the depth of insertion of the locking sleeve body into the accessory arm receiving passageway.

As a further aspect, the housing passageway can extend through the housing from the housing front to the housing rear, wherein the housing front faces toward the front of the trailer, and wherein the locking insert receiving opening is at the housing front, and wherein the locking sleeve extends approximately from the housing front to the housing rear, and wherein the locking sleeve has a lip surrounding the locking sleeve front end, the cross sectional dimension of the locking sleeve at the lip being greater than the cross sectional dimension of the locking insert receiving opening.

As a still further aspect, the locking insert can comprise a locking insert body, the locking insert body comprising a locking insert body front end and a locking insert body rear end, at least one locking flange having a proximal end and a distal end, wherein the proximal end of the locking flange is pivoted to the locking insert body at first location of the locking insert body, wherein the distal end of the locking flange projects outwardly from the first location and away from the rear portion of the locking insert body, the housing having at least one locking flange engaging projection extending inwardly toward the locking insert receiving passageway and positioned to engage the locking flange and pivot the locking flange distal end inwardly as the locking insert body is inserted locking insert body rear end first through the locking insert receiving opening and into the locking insert receiving passageway, the locking flange engaging projection having a front projection portion and a rear projection portion, the distal end of the locking flange being positioned rearwardly of the rear projection portion and pivoting outwardly rearwardly of the rear projection portion upon insertion of the locking insert to a location that positions the distal end of the locking flange rearwardly of the rear projection portion, the rear projection portion engaging the distal end of the locking flange to block the removal of the locking insert from the housing through the locking insert receiving opening.

As further aspects, the locking insert can comprise a first locking pin receiving opening positioned at a rear end portion of the locking insert, a first locking pin coupled to the housing and aligned with the first locking pin receiving opening, the locking pin being slidably coupled to the housing and movable between a first locking pin position in which the first locking pin extends through the first locking pin receiving opening into the accessory arm receiving passageway and a second locking pin position in which the first locking pin withdrawn from the accessory arm receiving passageway, a spring coupled to the housing and to the first locking pin that biases the first locking pin to the first locking pin position, a handle coupled to the pin and slidably coupled to the housing, the handle being movable from a first handle position in which the first locking pin is in the first locking pin position to a second handle position in which the first locking pin is in the second locking pin position, the handle being coupled to the spring and biased by the spring to the first handle position.

As another aspect, an accessory supporting arm can have a front arm end portion and a rear arm end portion, the rear arm end portion comprising a rear arm portion distal end, the rear arm end portion being sized for insertion into the accessory arm receiving passageway, the rear arm end portion having a pin engaging surface that converges toward the first locking pin moving from a first location to a second location along the rear portion of the accessory supporting arm, the first location being nearer to the rear arm portion distal end of the accessory supporting arm than the second location, the rear arm end portion having a first accessory arm pin receiving opening positioned further from the rear arm portion distal end of the accessory supporting arm than the second location, the first accessory arm pin receiving opening being located so as to be aligned with the first locking pin receiving opening at one position of insertion of the rear arm end portion into the accessory arm receiving passageway, wherein as the rear arm end portion is inserted into the accessory arm receiving passageway the pin engaging surface engages the first locking pin and pushes the first locking pin against the force applied by the spring to the second locking pin position, and wherein at said one position of insertion of the rear arm end portion into the accessory arm receiving passageway, the spring biases the first locking pin to the first locking pin position, and wherein in the first locking pin position the first locking pin is biased by the spring into the first accessory arm pin receiving opening to thereby lock the accessory supporting arm to the housing; and wherein the housing passageway, the bracket passageway, the locking sleeve and the accessory arm receiving passageway each have a rectangular cross section, and wherein the accessory supporting arm is rectangular with four sides and wherein one of said pin engaging surfaces and one of said first accessory arm pin receiving openings is located at each of the four sides of the accessory supporting arm.

As another aspect, an accessory mount can be provided for coupling an accessory supporting arm to first and second brackets coupled to a side member of the frame of a bicycle trailer having a front and a rear, the first bracket comprising a first bracket passageway and the second bracket comprising a second bracket passageway, the first and second bracket passageways being aligned in a front to rear direction along the frame side member, and the second bracket being positioned on the side member of the frame of the bicycle rearwardly of the first bracket. The accessory mount can comprise:

a housing having a housing exterior, a housing interior, a housing front, a housing rear and first and second housing sides, the housing comprising a locking insert receiving opening that communicates with the exterior of the housing and a housing passageway extending at least partially through the housing interior from the locking insert receiving opening and in a housing front to housing rear direction, the housing comprising first and second bracket receiving openings communicating with the interior of the housing through one of the first and second housing sides, wherein first bracket receiving opening being sized for insertion of at least a portion of the first bracket therethrough to position the first bracket opening within the housing interior, wherein second bracket receiving opening is sized for insertion of at least a portion of the second bracket therethrough to position the first bracket opening within the housing interior, wherein the housing passageway and the first and second bracket passageways are aligned with one another and with the locking insert receiving opening and together define a locking insert receiving passageway;

a locking insert positioned in locking insert receiving passageway and extending through the first bracket passageway, the housing passageway and at least partially through the second bracket passageway, wherein the locking insert couples the housing to the first and second brackets and thereby to the first frame side member;

the locking insert having an accessory arm receiving passageway communicating with the housing exterior through the locking insert receiving opening;

wherein the locking insert comprises a locking sleeve comprising a locking sleeve body comprising a front portion positioned in the first bracket passageway, a central portion positioned between the first and second bracket passageways and a rear portion positioned in the second bracket passageway;

wherein the housing passageway extends through the housing from the housing front to the housing rear, wherein the housing front faces toward the front of the trailer, and wherein the locking insert receiving opening is at the housing front, and wherein the locking sleeve extends approximately from the housing front to the housing rear, and wherein the locking sleeve has a lip surrounding the locking sleeve front end, the cross sectional dimension of the locking sleeve at the lip being greater than the cross sectional dimension of the locking insert receiving opening;

wherein the locking sleeve comprises at least one locking flange having a proximal end and a distal end, wherein the proximal end of the locking flange is pivoted to the locking sleeve body at first location of the locking sleeve body, wherein the distal end of the locking flange projects outwardly from the first location and away from the rear portion of the locking sleeve body, the housing having at least one locking flange engaging projection extending inwardly toward the locking insert receiving passageway and positioned to engage the locking sleeve flange and pivot the locking flange distal end inwardly as the locking sleeve body is inserted locking sleeve rear end first through the locking insert receiving opening and into the locking insert receiving passageway, the locking flange engaging projection having a front projection portion and a rear projection portion, the distal end of the locking flange being positioned rearwardly of the rear projection portion and pivoting outwardly rearwardly of the rear projection portion upon insertion of the locking sleeve insert to a location that positions the distal end of the locking flange rearwardly of the rear projection portion, the rear projection portion engaging the distal end of the locking flange to block the removal of the locking sleeve from the housing through the locking insert receiving opening;

wherein the locking insert comprises a first locking pin receiving opening positioned at a rear end portion of the locking insert, a first locking pin coupled to the housing and aligned with the first locking pin receiving opening, the locking pin being slidably coupled to the housing and movable between a first locking pin position in which the first locking pin extends through the first locking pin receiving opening into the accessory arm receiving passageway and a second locking pin position in which the first locking pin withdrawn from the accessory arm receiving passageway, a spring coupled to the housing and to the first locking pin that biases the first locking pin to the first locking pin position, a handle coupled to the pin and slidably coupled to the housing, the handle being movable from a first handle position in which the first locking pin is in the first locking pin position to a second handle position in which the first locking pin is in the second locking pin position, the handle being coupled to the spring and biased by the spring to the first handle position; and wherein the first locking pin receiving opening extends through a portion of the second bracket member.

In accordance with this disclosure, an accessory mount for coupling an accessory support arm to a bicycle trailer can comprise: a housing with a housing passageway; bracket means for coupling the housing to the bicycle trailer frame, the bracket means comprising a bracket passageway aligned with the housing passageway; insert means for insertion into the bracket passageway and comprising an insert passageway for receiving the accessory support arm; and means for selectively locking the received accessory supporting arm within the insert means.

The invention includes all novel and non-obvious combinations and sub-combinations of the of aspects and features as will as with those additional features and aspects described below and shown in the drawings.

BRIEF DESCRIPTION OF THE DRAWINGS

FIG. 4 also illustrates a perspective view of one form of a locking insert that can be used to couple the housing to the bracket members.

FIG. 5 is a side elevational view of a portion of the locking insert showing one form of a locking flange that can be used to lock the locking insert in place within the housing to thereby securely mount the housing to the bicycle frame member.

FIGS. 6, 7 and 8 are exemplary forms of locking inserts that can comprise locking sleeves.

FIG. 9 is a perspective view of the housing with the locking insert positioned within the housing.

FIG. 10 is a perspective view of the housing coupled to a trailer with the locking insert and also illustrating a portion of an accessory supporting arm being inserted into an accessory arm receiving passageway of the mount.

DETAILED DESCRIPTION

The following explanations of terms are provided to better describe the present disclosure and to guide those of ordinary skill in the art in the practice of the present disclosure. As used herein, the words "including" and "having" and their formatives (e.g. has, have, include, includes) have the same meaning as "comprising" and its corresponding formatives. Also, the singular forms "a" or "an" or "the" include plural references unless the context clearly dictates otherwise. The term "or" refers to a single element of stated alternative elements or a combination of two or more elements, unless the context clearly indicates otherwise. The term "coupled to" (e.g. element A is coupled to element B) includes direct connection of the elements and also includes indirect connection of the elements through one or more other elements. The terms "about" and "approximately" with respect to a value or stated range or orientation, unless otherwise stated, means plus or minus ten percent of the recited value, range or orientation.

Examples are described with reference to directions indicated as "above," "below," "upper," "lower," "top", "bottom", "ascending", "descending", and/or the like. These terms are used for convenient description, but do not imply or require any particular spatial orientation. For example, a mount described as having a front and a rear is typically oriented in use with the front of the mount facing forwardly. If the orientation is changed such that the front end of the mount faces upwardly, the mount still has a front. The term "and/or" is to be broadly construed to include all possible combinations of elements or items with which the term is used, as well as the elements or items individually. The term "adjacent" means two components are positioned without other components being positioned between the adjacent portions of the two components.

Unless explained otherwise, all technical and scientific terms used herein have the same meaning as commonly understood to one of ordinary skill in the art to which this disclosure belongs. Although methods and materials similar or equivalent to those described herein, suitable methods and materials are described below. The materials, methods, and examples are illustrative only and not intended to be limiting, unless otherwise indicated. Other features of the disclosure will be apparent from the following detailed description.

Figure 1:
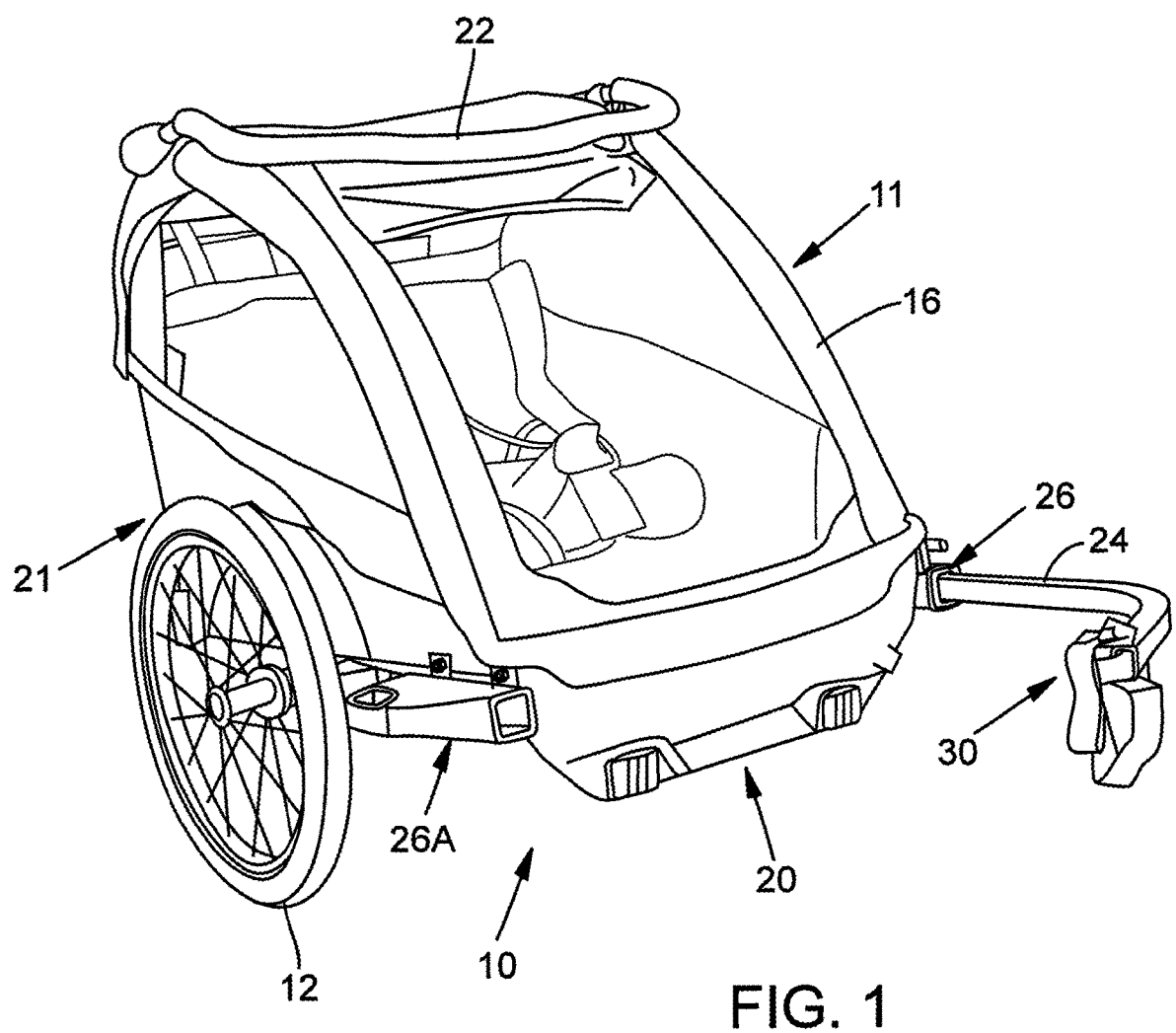
FIGS. 1 and 2 are perspective views of an embodiment of a bicycle trailer with accessory arm supporting mounts in accordance with this disclosure shown coupled to the side frame members of the bicycle trailer.
Figure 2:
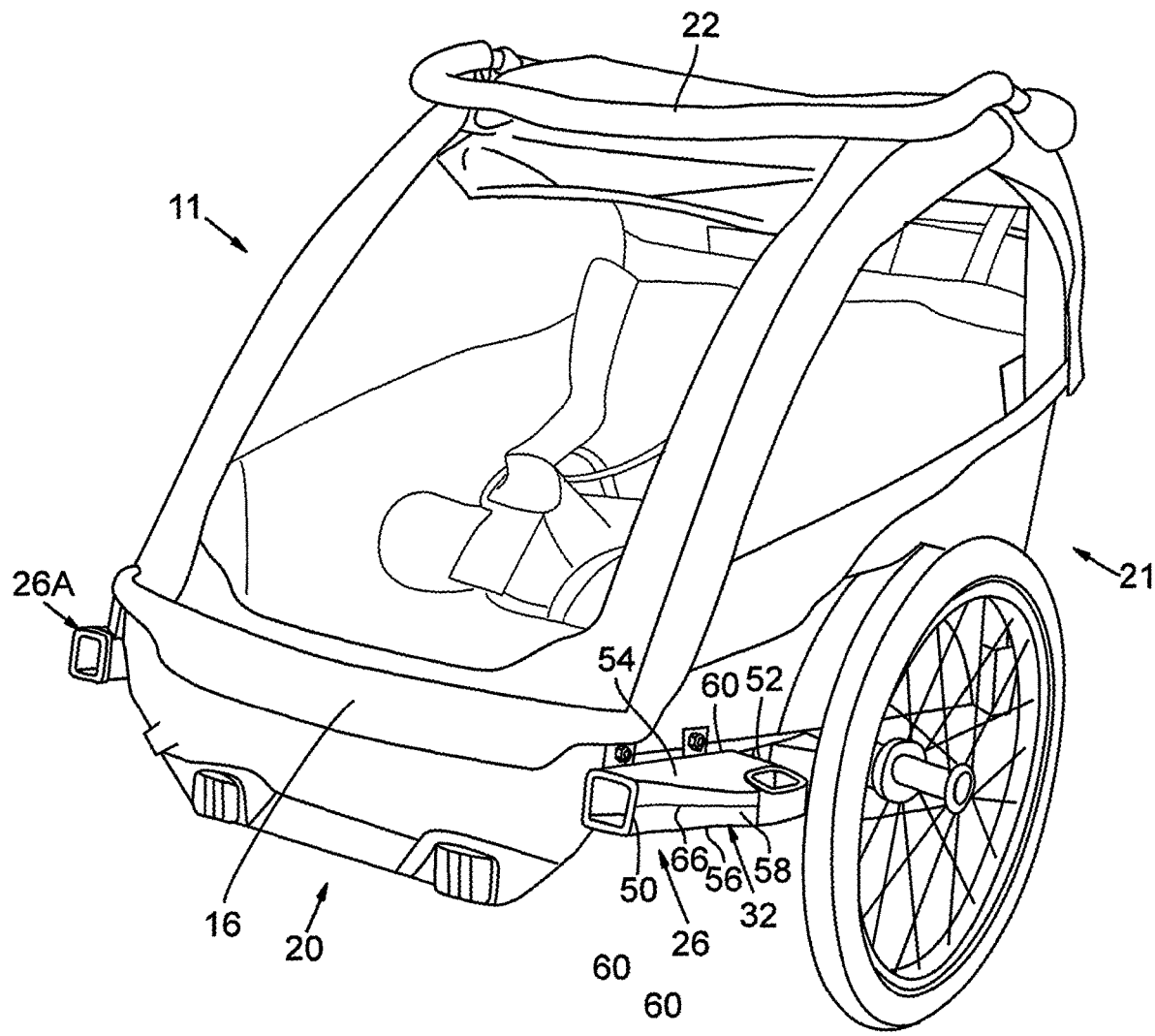
Figure 2A:
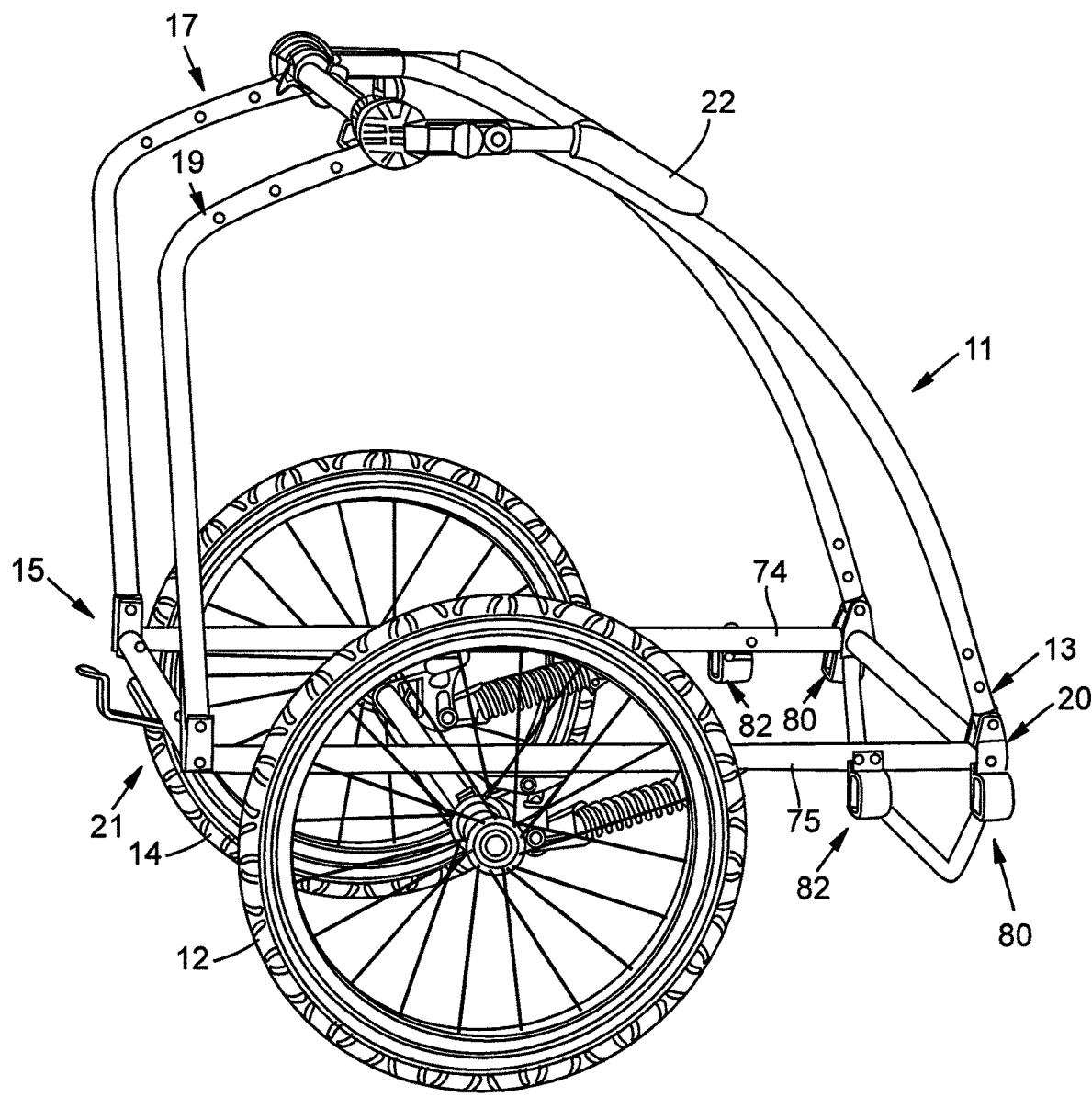
FIG. 2A is a perspective view of an exemplary trailer frame with wheels attached thereto.

FIGS. 1 and 2 illustrate an exemplary bicycle trailer 10. FIG. 2A illustrate an exemplary bicycle trailer frame.

With reference to these FIGS, the bicycle trailer has first and second wheels 12, 14 and a frame 11 onto which a trailer covering 16 is mounted. With reference to FIG. 2A, the exemplary frame 11 comprises front and rear frame portions 13, 15 and first and second side frame members 74, 75 on opposite sides of the trailer. In FIG. 2A, the side frame members 74, 75 extend from the front to the rear of the trailer. In addition, the trailer typically has side frame portions 17, 19, that include the side frame members 74, 75 at a lower portion of the respective side frame portions. The side frame portions extend from the front frame portion 13 to the rear frame portion 15 and thereby from the front of the trailer 20 to the rear of the trailer 21. The frame can comprise any suitable durable material, such as aluminum tubing bent and coupled together by couplings or welded together, fiber reinforced polymer or composite materials, steel (although this is less desirable due to its weight), and/or titanium.

The trailer of FIG. 1 also includes a handle 22 that can be raised in the event the trailer is disconnected from a bicycle and pushed by a user, such when the trailer is used for jogging or as a stroller. It is to be understood that the term bicycle trailer refers to a trailer that in one mode can be towed by a bicycle but in other modes can be used in other manners, such as for jogging or as a stroller, with a child or cargo positioned within the interior of the trailer.

In FIG. 1, an exemplary accessory supporting arm 24 is inserted into a mount 26 to couple the accessory supporting arm 24 to the bicycle trailer frame. In FIGS. 1 and 2, two such mounts 26 and 26A are shown. Mount 26 is coupled to frame side member 74 and mount 26A is coupled to side frame member 75. Desirably, each of the mounts 26, 26A can be the same (albeit mirror images of one another) so the description will proceed below with reference to mount 26. It should be understood that mount 26 desirably can simply be inverted to comprise mount 26A. Hence, the same mount can be used in this example at both sides of the trailer.

The illustrated arm 24 has a trailer hitch 30 as an accessory coupled thereto. The hitch can be a conventional hitch for coupling to the rear axle of a bicycle or to other bicycle components depending upon the nature of the hitch. The accessory supporting arms can be of different shapes and dimensions. For example, if the accessory is a wheel, a shorter support arm can be used and one such arm can be placed in each of the mounts 26, 26A to provide a wheel at each side of the trailer. Other accessories can also be mounted in the alternative, such as a single wheel coupled to two accessory support arms, each of such arms being received by a respective one of the mounts 26, 26A The illustrated mount 26 comprises a housing 32 that includes a first or front end 50, a rear end 52, a top 54, a bottom 56 and first and second side portions 58, 60. Side portion 58 can comprise a side wall that flares outwardly in a front to rear direction, such that the housing is wider moving in a front to rear direction and can be wider toward the rear end 52 than toward the front end 50. The outer housing side wall desirably extends outwardly to be approximately even with or extent further than the outer edge of the wheel 14. The illustrated housing 32 can therefore comprise a brush guard or deflector as the side wall can engage the brush or other objects as the trailer moves forward to assist in guiding the engaged brush or objects past the wheel 14.

The housing can comprise upper and lower housing sections split along a horizontally extending seam 66 with the housing sections secured together, such as by fasteners, with bolts or screws being an example. Alternatively, the housing sections can be secured together in other ways, such as by adhesive.

Desirably when the housing is sold to a user of the trailer, the mount 26 is disconnected from the trailer frame to reduce the width of the shipped trailer. In addition, the mount is can be pre-assembled. This enables an end user to easily couple the pre-assembled mount 26 to the trailer using the locking insert as explained below.

Figure 3:
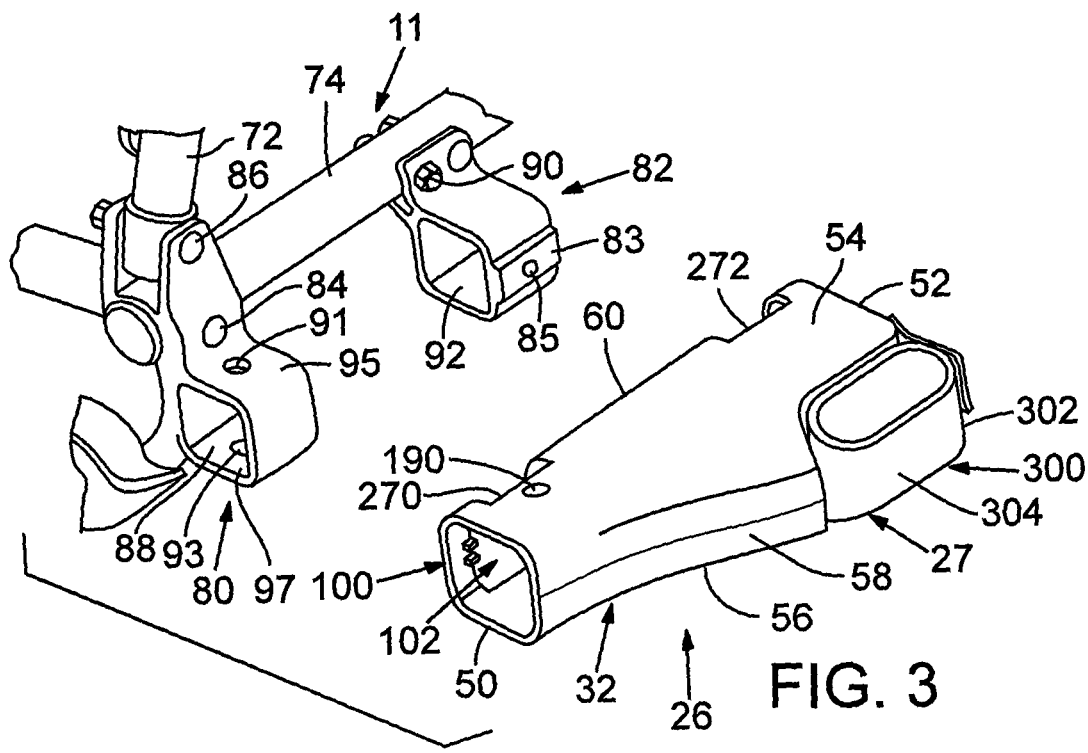
FIG. 3 is a perspective view of an embodiment of a housing for the mount and exemplary bracket members coupled to a side frame member of the bicycle trailer.

With reference to FIG. 3, a portion of the bicycle trailer frame 11 is shown. Specifically, a portion of the upright frame member of the side frame portion is indicated at 72 and a first side frame member is indicated at 74. A second side frame member 75 (FIG. 2A) is desirably provided at the opposite side of the trailer.

A bracket comprising in this example, first and second bracket members 80, 82 are shown in FIG. 3 mounted to the bicycle frame, and to the side frame member 74 in this example. The bracket members 80, 82 can be one continuous bracket or discrete bracket elements as shown in this FIG. 3. The bracket members desirably can be made of the same materials as the frame, such as aluminum, although desirable, this is not required. In FIG. 3, the bracket members are shown as discrete spaced apart bracket members. The bracket can be a single bracket coupled to the bicycle frame, such as to a side member or other portion of the bicycle frame and desirably comprises an insert receiving passageway sized and positioned to receive a locking insert.

The front bracket member 80 in FIG. 3 is shown fastened by bolts 84, 86 to the respective frame components. In addition, the bracket member 80 defines or comprises a first bracket passageway 88. The second bracket member 82 is fastened to frame member 74, by a fastener such as by a bolt or screw 90. More than one fastener can be used for anchoring the second bracket member 82 to the side frame member. The second bracket 82 defines or comprises a second bracket passageway 92.

The portions of the bracket members that define the respective passageways can be a section of a tubular extrusion, such of aluminum or other metals or metal alloys. The bracket member 82, if positioned at the location of the locking pin 350 in the embodiment described below in connection with FIG. 11, can have a locking pin receiving opening 85 through an outer wall portion 83 thereof spaced from the side frame member 74. In addition, the first bracket member 80 can be provided with a safety pin receiving opening, such as, as a pair of aligned openings 91, 93 extending through a top wall portion 95 of bracket member 80 and a bottom wall portion 97 thereof.

The bracket member 80 in the illustrated embodiment entirely surrounds the passageway 88 and the bracket member 82 entirely surrounds the passageway 92. The passageways 88 and 92 are desirably aligned with one another in a direction from the front to rear of the trailer, such as having centers with longitudinal axes that are collinear and that are parallels the side frame member 74.

The housing 32 has a housing exterior outside of the housing and a housing interior within the housing. The housing also comprises a locking insert receiving opening 100 that communicates between the exterior and the interior of the housing. In addition, the housing comprises a housing passageway 102 (FIG. 3) extending at least partially through the housing interior from the locking insert receiving opening 100. In the FIG. 3 example, the locking insert receiving opening is accessible at, and can extend through, the housing front 50. In addition, the housing passageway 102 can extend from the locking insert receiving opening in a housing front to a housing rear direction. The housing passageway 102 is best seen in FIG. 12.

It should be noted that the housing passageway 102 may extend only partially through the housing. In addition, although less desirable, the locking insert receiving opening 100 can be positioned at the rear 52 of the housing with a locking insert (as explained below) being inserted from the rear of the housing through the locking insert receiving opening and into the housing passageway 102 to lock the housing 32 to the bracket members 80, 82.

Referring again to FIG. 12, the housing passageway 102 and the first and second bracket passageways 88, 92 are desirably aligned with one another and also aligned with the locking insert receiving opening 100. The locking insert receiving opening 100, the housing passageway 102, and the first and second bracket passageways 88, 92 together define a locking insert receiving passageway 160 (FIG. 4) that desirably extends from the housing front 50 and at least partially through the bracket member passageways and the housing interior of the housing 32, and more desirably entirely through these elements as shown in FIG. 12.

Figure 4:
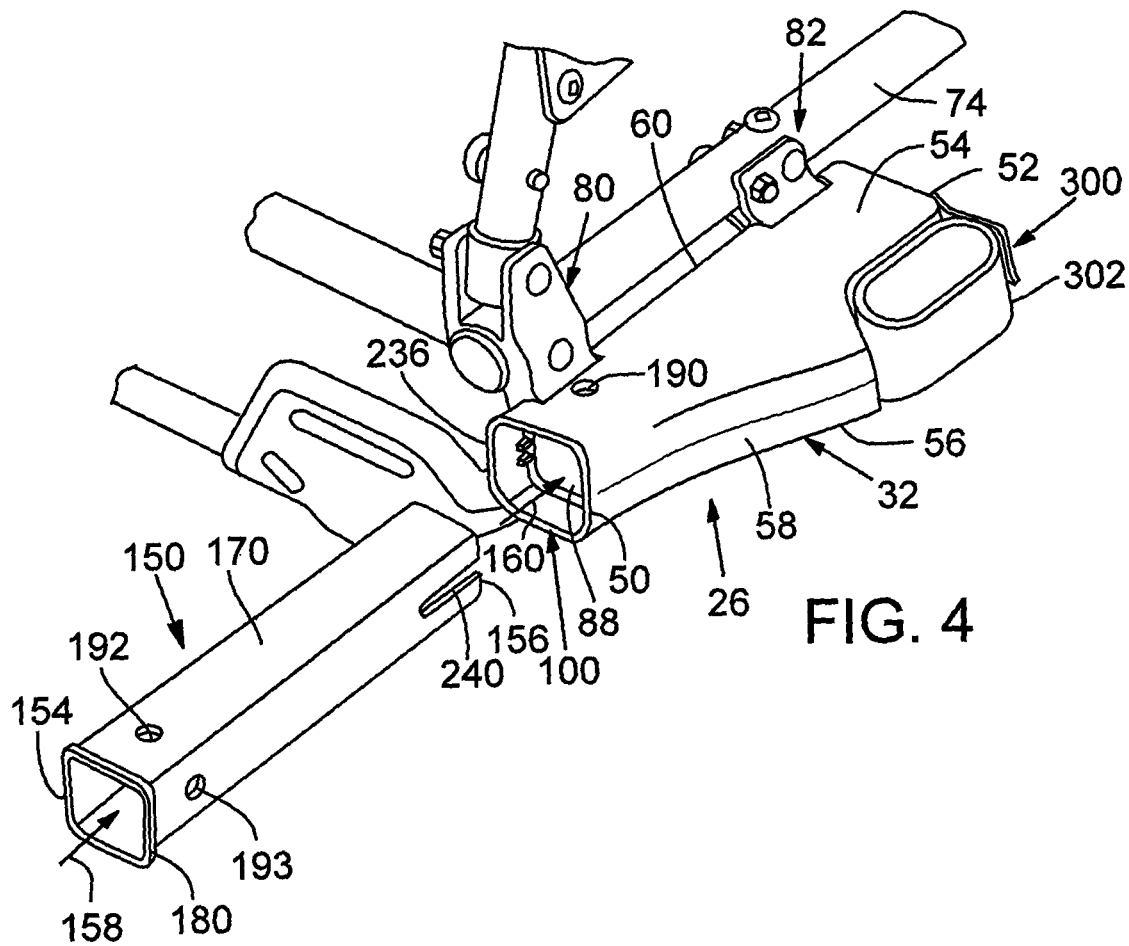
FIG. 4 is a perspective view of the housing of FIG. 2 positioned on the bracket members; in this example portions of the bracket members being inserted into the housing.
Figure 12:
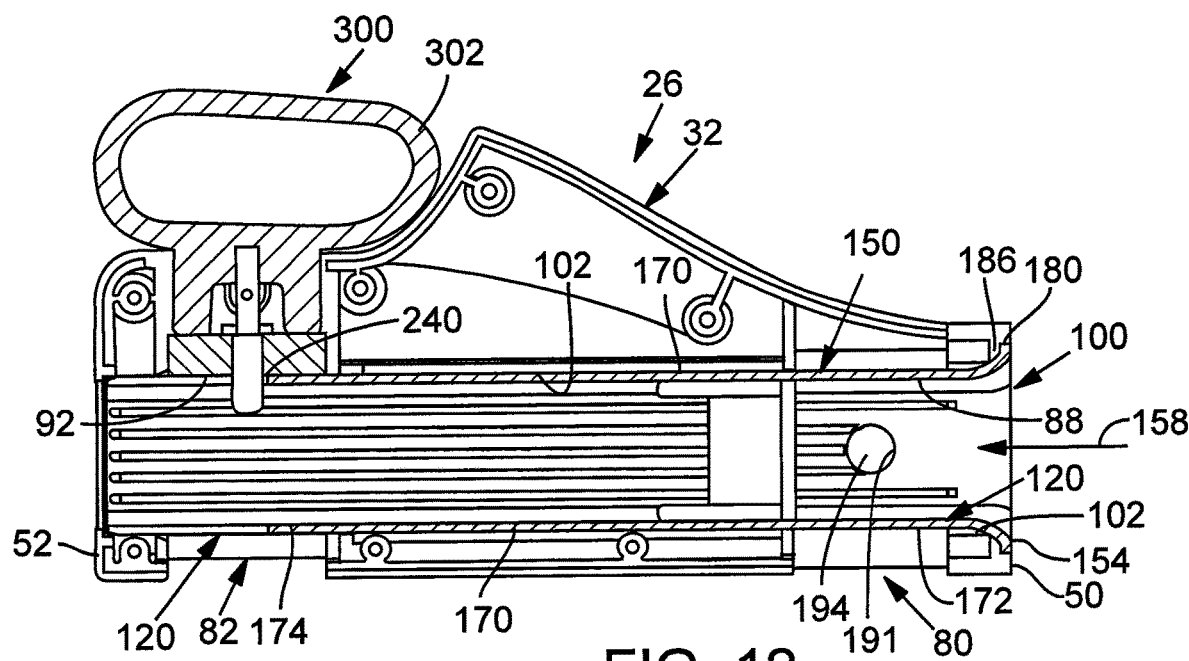
FIG. 12 is a horizontal sectional view of the mount of FIG. 10 taken generally in the direction of line 12-12 of FIG. 10.

With reference to FIGS. 4 and 12, a locking insert 120 is positioned in the locking insert receiving passageway 160 defined by the first and second bracket passageways 88, 92 and housing passageway 102. The locking insert extends at least partially through each of the first and second bracket passageways 88, 92 and more desirably entirely through each of the bracket passageways, and also at least partially through the housing passageway 102. When the locking insert is inserted into the locking insert receiving passageway, the locking insert couples the housing to the first and second bracket members 80, 82 and thereby to the first frame side member 74. Desirably the locking insert has an exterior cross-sectional shape and dimensions that is equal to, or one to five percent smaller than, the interior cross sectional dimensions of the bracket member passageways 88, 92 so that the locking insert, when inserted into the bracket member passageways can abut and tightly engage the interior walls of the bracket member passageways.

The locking insert can take a variety of forms. In FIG. 4, the locking insert is illustrated as a locking sleeve 150 with a locking sleeve body having a front end 154 and a rear end 156. The locking sleeve 150 in this illustrated example, has an accessory arm receiving passageway 158 extending in a front to rear direction. In addition, the locking sleeve 150 comprises an accessory arm receiving passageway 158 that extends in a front to rear direction through the locking sleeve insert 150. When the locking sleeve 150 is positioned within the locking insert receiving passageway 160 as shown in FIG. 9, the accessory arm receiving passageway 158 is accessible from the exterior of the housing 32 through the locking insert receiving opening 100.

Referring again to FIG. 12, the locking insert, in this example the locking sleeve 150, comprises a locking sleeve body 170 comprising a front portion 172 positioned in the first bracket member passageway 88, a central portion 172 positioned between the first bracket member passageway 88 and the second bracket member passageway 92, and a rear portion 174 positioned in the second bracket member passageway. Desirably, the locking insert 150 extends entirely through the first and second bracket member passageways and more desirably extends from the front 50 to the rear 52 of the housing 32.

The depth of insertion of the locking sleeve 150 into the housing can be controlled in many ways, such as by including one or more stops within the housing or other interengaging features between the housing and the locking sleeve insert. However, in one desirable approach, and with further reference to FIGS. 4 and 12, the locking sleeve front end 154 desirably has a least one cross-sectional dimension that is greater than the cross-sectional dimension of the locking insert receiving opening 100. Upon insertion, the locking sleeve 150 into to the locking insert receiving passageway 160, the front end of the locking sleeve engages the housing at or adjacent to the locking insert receiving opening 100 and limits the depth of insertion of the locking sleeve body 170 into the locking insert receiving passageway 160. In one specific example, as exemplified by FIG. 4, the locking sleeve comprises a lip 180 at the front 154 of the locking sleeve 150 that at least partially surrounds, and more desirably entirely surrounds, the locking sleeve front end 154 of the locking sleeve body. The locking sleeve lip has a greater cross-sectional dimension than the locking insert receiving opening 100 (see, for example, FIG. 12). Consequently, the lip 180 engages the portion of the housing surrounding the locking sleeve insert receiving opening 100 as illustrated at 186 in FIG. 12, to thereby limit the depth of insertion of the locking sleeve insert 150.

As previously mentioned, the locking insert receiving opening 100 can be at other locations of the housing 32, besides being accessible from the front 150 of the housing. For example, the opening 100 can be at the rear of the housing with the insert being inserted into the locking insert receiving passageway from the rear of the housing 32.

Again, with reference to FIG. 4, the housing 27 can have aligned safety pin receiving openings 190, 191 (only the top one 190 being shown in FIG. 4 and the bottom one being indicated by the number 191 in FIG. 12) extending through the top and bottom of the housing. These openings, if provided, are desirably aligned with the openings 91, 93 through the bracket member 80. In addition, the sleeve body 170 can have an upper opening 192 (FIG. 4) and a lower opening 194 (FIG. 12) that end up aligned with the opening 190, 191 through the housing and the openings 91, 93 through bracket member 80. The accessory supporting arm 24 can also have an opening 196 extending through the arm (see FIG. 10). The openings 91, 93, 190 upper and 190 lower, 192 and 194, and openings such as 196 through the accessory supporting arm 24 are desirably aligned when the accessory supporting arm is inserted into the housing and locked in place by a locking pin 350 as explained below. Consequently, a safety pin can be inserted though these aligned openings to provide additional security with respect to holding the accessory receiving arm within the mount. In addition, by inserting a safety pin through openings 91, 93 of bracket member 80, the bracket member, especially if of a durable material, such as aluminum or a metal or metal alloy, reinforces the safety pin connection. This is desirable particularly in embodiments where the housing 27 and insert sleeve 150 are made of plastic.

As also shown in FIG. 10, an additional opening 198 can extend through the accessory supporting arm in a direction perpendicular to the opening 196 but in the same vertical plane as opening 196. Consequently, regardless of the direction of insertion of the accessory arm into the housing in this embodiment, either the opening 196 or the opening 198 will be aligned with the openings 190, 192 and 194 or the opening 198 will be in such alignment, such that the safety pin can be inserted regardless of the orientation of the accessory mounting arm. Additional openings can be provided in the accessory supporting arm as desired to provide additional locking positions for receiving a locking pin 350 as explained below in connection with FIG. 11. In a desirable example, the accessory arm receiving passageway 158 extends entirely through the housing 27. The accessory supporting arm can, in this example, pass entirely through the housing to positions that any selected one of a plurality of locking pin receiving openings in position to receive the locking pin 350, which change the length of the portion of the accessory supporting arm that projects forwardly from the housing. For example, the opening 198 can correspond to a second of the locking pin receiving openings.

Figure 14:
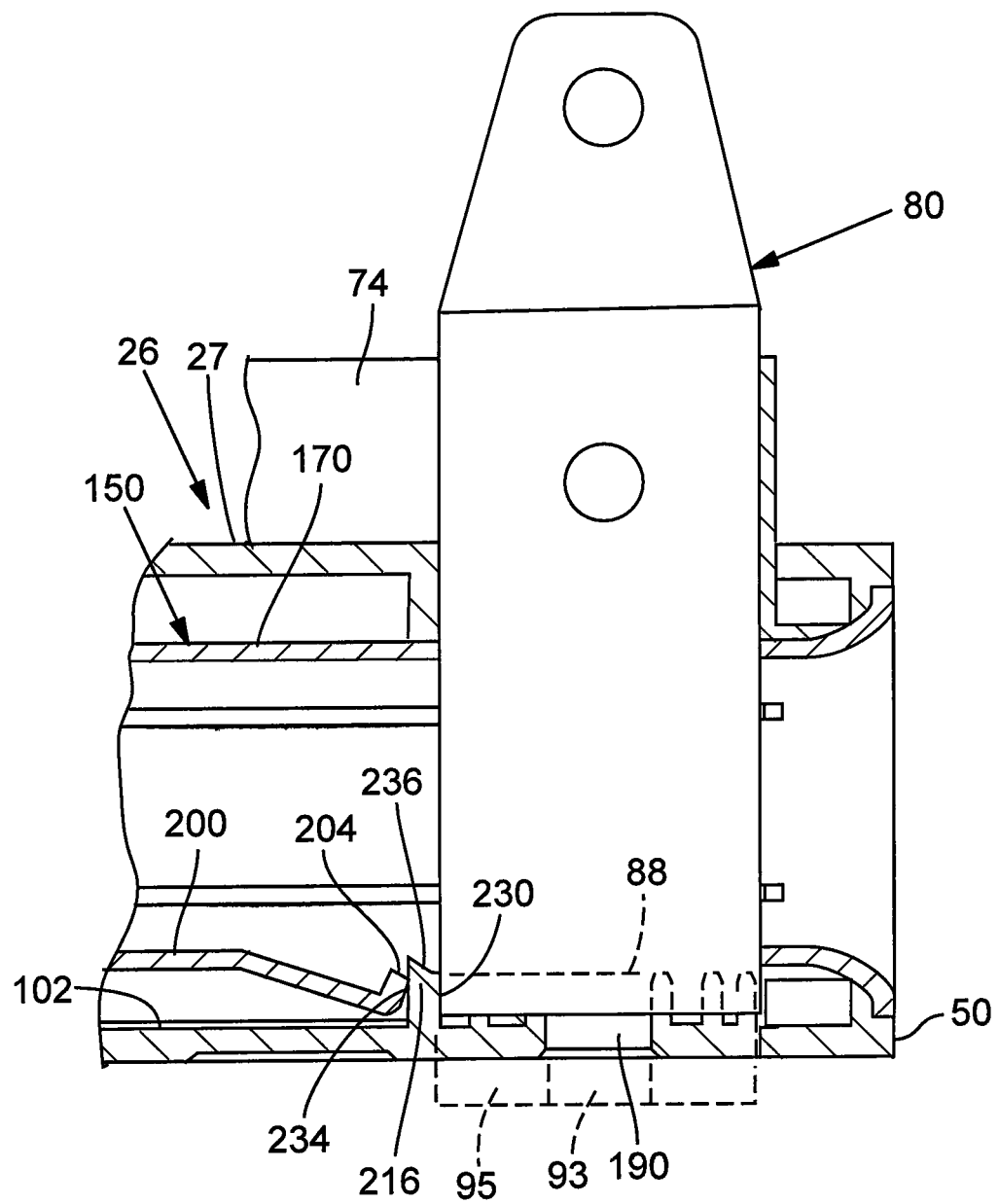
FIG. 14 is a vertical sectional view through a portion of the mount and locking insert and illustration the functioning of the locking flange.

As previously mentioned, the locking insert or sleeve 150 can be inserted into the insert receiving passageway and held therein by press fitting. Alternatively, interfitting features can be provided in the housing and locking insert that are engaged to prevent the removal of the locking insert after it has been inserted. In one specific example, as best seen in FIGS. 5 and 14, the locking sleeve can comprise at least one locking flange 200 having a proximal end 202 and a distal end 204. Proximal end 202 is pivoted to the locking sleeve body 170 at a first location 206 of the locking sleeve body.

In addition, the distal end 204 of a locking flange 200 projects outwardly from the first location and away from a first portion 210, such as a rearwardly positioned portion of the locking sleeve 150. For example, the locking flange projects outwardly from the first location 206 and away from the rear portion of the locking sleeve body 210. In addition, with reference to FIG. 14, the housing 27 has at least one locking flange engaging projection 216 extending inwardly toward the locking insert receiving passageway; but in this example does not extend into the locking insert receiving passageway. The locking flange engaging projection 216 is positioned to engage the locking sleeve flange and pivot the locking sleeve flange distal end 204 as indicated in the direction of arrow 220 inwardly as the locking sleeve body 170 is inserted into the locking sleeve and the locking insert receiving opening with the locking sleeve rear end portion 210 being inserted first. If the locking sleeve were inserted from the rear end of the housing, portion 210 would still be considered the rear end and would be inserted rear end first. The locking flange engaging projection 216 has a front end portion 230 and a rear end portion 234 which comprise in this example, respectively opposed inwardly extending surfaces of the projecting flange 216. A beveled surface 236 is also provided in flange 216 in this example. The surface 230 being shorter than the surface 234 as the beveled surface ends further inwardly into the insert receiving passageway moving from a front to rear direction in this example. With further reference to FIG. 14, with the insert 150 fully inserted into the housing, the distal end 204 of the locking flange is positioned rearwardly of the rear projection portion 234, and in this example, abuts the rear surface 234. Also, once the distal end 204 is inserted past the flange 216, it pivots outwardly and rearwardly of the rear projection portion 234. Rear projecting portion 234 engages the distal end 204 of the locking flange 200 and prevents the locking sleeve 150 from being removed from the housing.

Referring again to FIG. 4, locking flange engaging projection 216 can comprise a plurality of such projections. The locking flange projection and comprises a plurality of such projections, such as the two side by side projections as shown in FIG. 4. It should be noted that in FIG. 14, the locking flange projection 216 is shown extending inwardly from the bottom of the housing whereas in FIG. 4 the projection 236 is shown projecting inwardly from a side wall of the housing. These alternative embodiments are each suitable.

With reference to FIGS. 6-8, various forms of locking inserts are illustrated. In the FIG. 6 form, the locking insert comprises a locking sleeve 150A having a lip 154A and defining a locking arm receiving passageway 158A. In addition, an opening 192A is shown through the top surface of the locking sleeve body 170A of the insert of FIG. 6. In addition, as in the case of the FIG. 4 embodiment, a rear portion of at least one of the side walls of the locking sleeve body is provided with a slot 240 that opens to the rear 242 of the illustrated insert. The slot 240 is designed to allow the passage of the insert with a locking pin actuated by an actuator such as a handle being positioned in the insert slot 240 as the insert is positioned more fully into the housing.

In the embodiment of FIG. 6, elements of the locking sleeve in common with those shown in FIG. 4 have been assigned the same numbers. In the embodiment of FIG. 6, the body 170 of the sleeve in this example extends continuously from front to rear. In addition, the slot 240A may be replicated on all surfaces of the body (such as indicated by slot 240A). With this construction, the sleeve can be inserted into the housing regardless of the orientation of the sleeve (e.g., one side up, the other side up, a third side up, or the fourth side up) while still interconnecting the housing to the bracket members. As a result, a consumer can easily assemble the housing to the bracket members, especially if the housing is already pre-assembled.

The embodiment of FIG. 7 is like the embodiment of FIG. 4 except that additional openings 250 are shown in the walls of central portions of the body 170 of the sleeve 150.

In the embodiment of FIG. 8, the sleeve 150 is comprised of front and rear sleeve portions 150A and 150B. These sleeve portions can be separated from one another with an optional spacer positioned therebetween. The sleeve portion 150 can be inserted in the bracket passageway 92 of bracket 82 and the sleeve 150A can be inserted in the bracket passageway 88 of bracket 80 to retain the housing coupled to the frame 74 via the brackets 80, 82. In FIG. 8, a projection 252 is shown in one wall surface of the sleeve 150A which can engage a detent or recess in the housing when the insert is in position. Similarly, a projection 254 can engage a recess in the rear portion of the housing to hold the sleeve rear portion in position when inserted.

In the illustrated embodiments, the locking insert, such as sleeve 150, the bracket passageways 88 and 92 and portions of the housing passageway 102 are of rectangular configuration, and more desirably, are square. However, other configurations can also be used. Desirably, the configurations are not round but have some surfaces that engage one another to prevent relative rotation of the accessory mounting arm relative to the locking insert when the accessory mounting arm is positioned in the accessory arm receiving passageway of the locking insert.

Referring to FIGS. 3 and 9, the side wall 60 of the housing comprises respective first and second openings 270, 272. The bracket member 80 can be inserted into the opening 270 to position the first bracket member passageway 88 within the interior of the housing. The bracket member 82 can be inserted into the opening 272 to position the second bracket member passageway 92 within the interior of the housing. Again, the housing can comprise a plurality of housing sections that can be placed on the bracket members and fastened together with the bracket members positioned therebetween. However, more desirably, the openings 270, 272 are sized large enough so that the assembled housing can simply be placed onto the bracket members 80, 82 with the passageway defining portions, or at least portions thereof, being inserted into the respective openings 270, 272 of the assembled housing 32.

As shown in a number of the FIGS., and as more fully explained below, a latch with a latching actuator 300, such as a handle 302, is illustrated. As shown in FIG. 3, the outer surface 304 of the handle is desirably flush with or recessed nearer to the side frame member 74 than the adjacent forwardly positioned surface of the side wall 58 of the housing. As a result, the housing assists in guiding brush and the like past the handle 300 and past the wheel 14 as the trailer moves in a forward direction.

With reference to FIG. 10, the accessory mounting arm 24 can include a locking pin receiving opening 306 through a side wall or surface 310 of the arm 24 that faces the handle 300. Additional locking pin receiving openings can also be provided, such as 308 in FIG. 10. The user can insert the accessory supporting arm into the housing until the selected opening is aligned with the locking pin 350 as explained below. Additional safety pin receiving openings, such as 196 in FIG. 10, can be provided in the accessory supporting arm so that one such safety pin receiving opening is aligned with the openings 190, 191 regardless of which of the selected safety pin receiving openings that is being used. The accessory arm receiving passageway 158 can extend entirely through the housing in examples where the accessory supporting arm extends outwardly from the rear of the housing. Openings, such as indicated at 308 can be provided through the other surfaces of the arm 24 to receive a locking pin if the arm is in a different rotational position when inserted into the accessory arm receiving passageway 158. The arm can be provided with a pin engaging end portion 314, such as a cap piece, with a tapered surface 312 that engages and pushes a latching pin 350 (FIG. 11 and as explained below) out of the accessory arm receiving passageway 158 to allow positioning of the accessory receiving arm 24 into the accessory arm receiving passageway. The end of the pin 350 is inserted into opening 306 upon alignment of the pin with the opening 306. Surface 312 in this example tapers from a front to rear direction. That is, the rear portion of the surface 312 at the tip 315 of the end portion 314 is positioned further inwardly from the outer surface of wall 310 of the accessory mounting arm than the inwardly positioned portions of surface 312. The end portion 314 can be a cap piece 317, such as a four-sided cap piece with four tapering surfaces. That is, for example, in FIG. 13, a first surface 312 of one form of a cap piece 317 is shown and another tapered surface 320 of the cap piece is also shown opposite to surface 312. The surfaces 312, 320 diverge moving away from the tip 315. The cap 317 is shown inserted into an end portion 322 of the accessory mounting arm 24. Cap 317 can be press fit or otherwise coupled to the arm 24.

Figure 13:
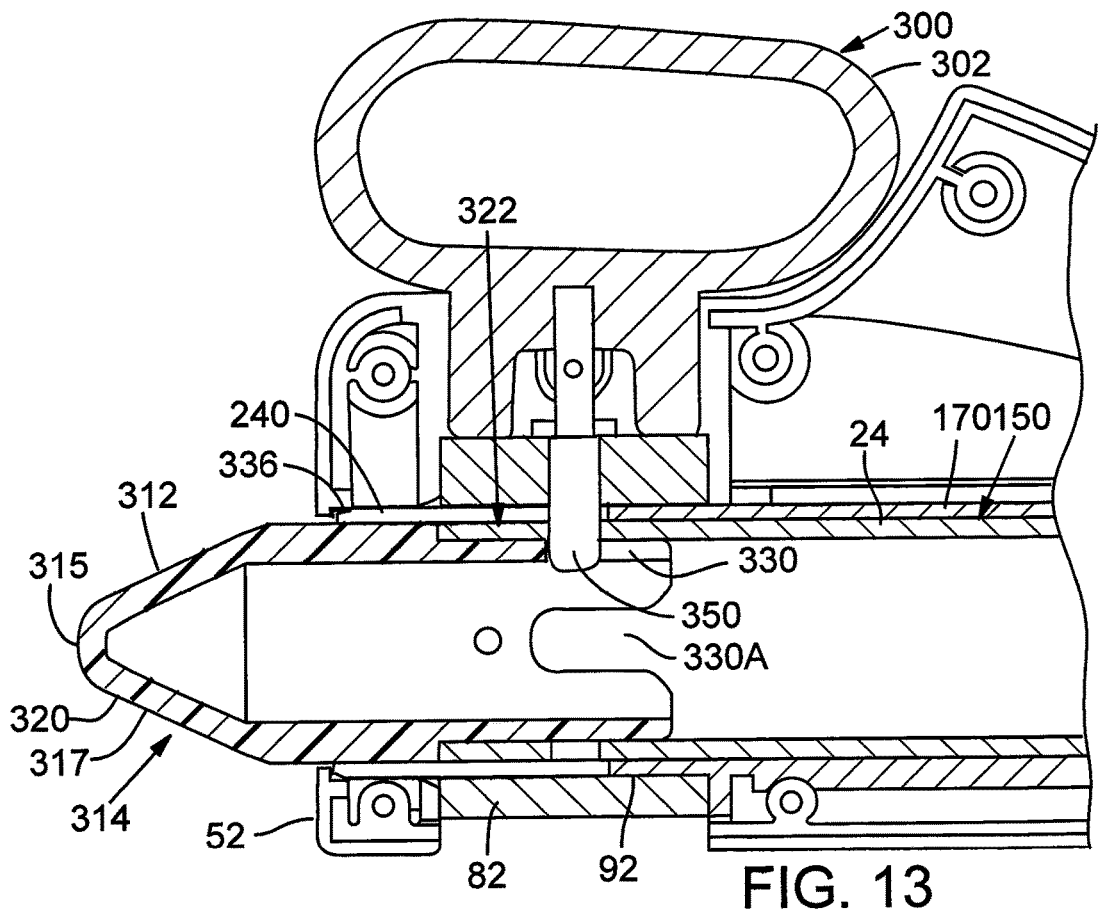
FIG. 13 is a horizontal sectional view of an end portion of the mount of FIG. 10 with a portion of the accessory supporting arm shown in this FIG.

The cap 317 can be provided with a slot 330 to accommodate the actuating pin 350 as shown in FIG. 13. All four sides of the cap can be provided with a similar slot, such as indicated by slot 330A in FIG. 13. In this example, the cap 317 can be placed on the accessory mounting arm 24 with any of the arm side walls facing the pin 350 as a tapered surface of the cap piece will be in a position to engage the pin 350 regardless of which side wall of the illustrated arm faces the pin. In one desirable form, the cap for use with an arm of rectangular cross-section can be a four-sided pyramid and can be frustopyramidal in shape.

Figure 11:
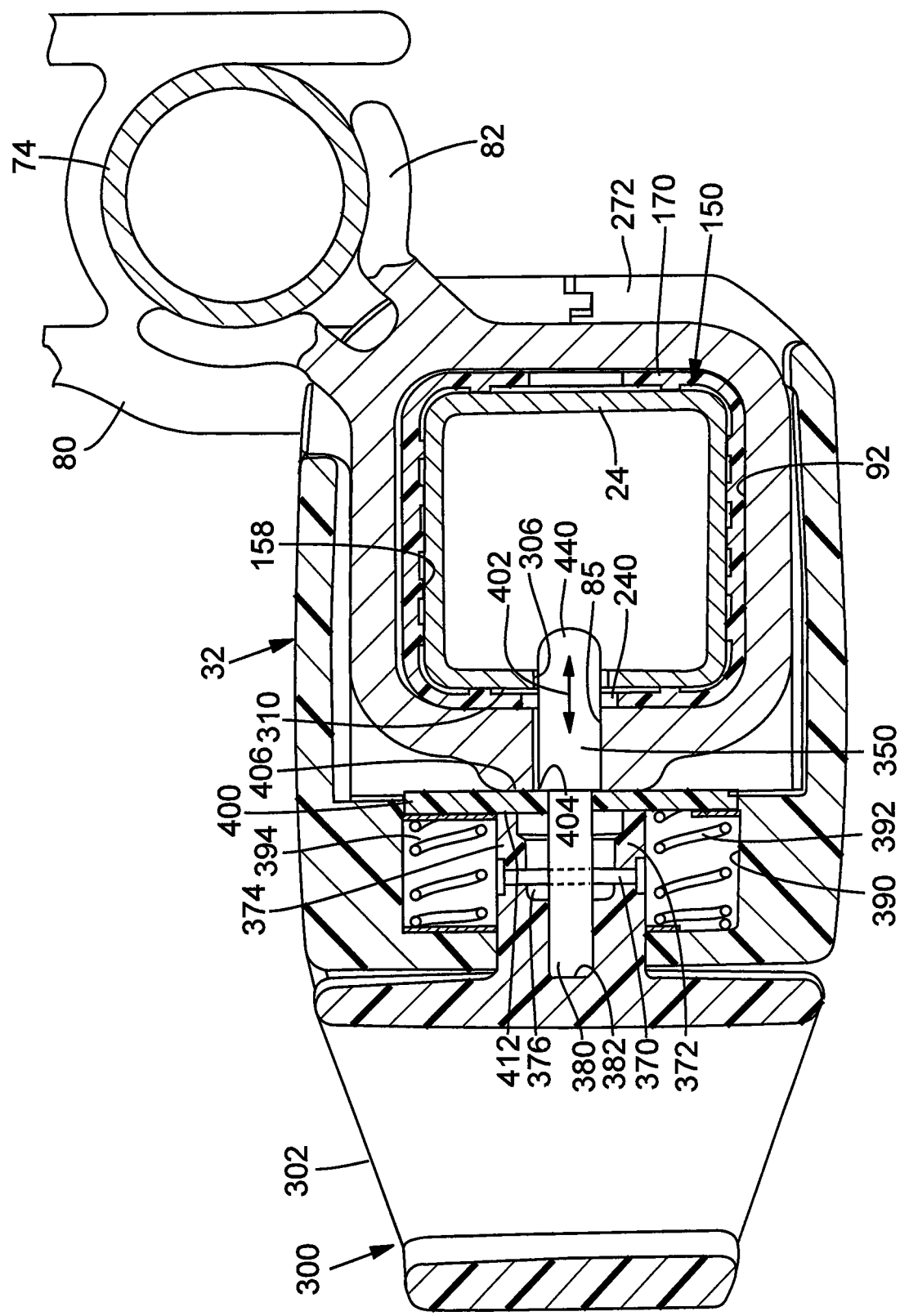
FIG. 11 is a vertical sectional view, taken along line 11-11 of FIG. 10 showing a form of latching mechanism that can be used to detachably retain the accessory supporting arm in the housing passageway.

With reference to FIGS. 11 and 12, locking insert or locking sleeve 150, in this example, comprises a first locking pin receiving opening, which in this example can comprises the slot 240 as previously described. A first locking pin 350 is aligned with the first locking pin receiving opening 240 and also with the opening 306 in accessory arm 24 when the accessory arm is in position for attachment to the mount. Also, desirably the pin 350 can also pass through an opening 85 in the portion of the bracket member 82 that defines the bracket member passageway 92 of the bracket member 82. The bracket member therefore also reinforces the housing where the locking pin 350 is received when the locking pin engages the accessory supporting arm in a locked position. This can be especially desirable if the bracket member is of metal and the housing 27 is of plastic, and/or both the housing and locking sleeve 170 are of plastic.

The locking pin 350 is slidably coupled for movement from a first locking pin position shown in FIG. 11 to a second unlocking pin position in which the pin 350 is retracted so that it does not extend through the arm 24. More specifically, in this example, the pin 350 is coupled to the handle 302 by a coupling pin 370 that extends through the pin 350 and also through respective spaced apart arm portions 372, 374 of the handle 302. The pin 350 in this example passes into and through a space 376 between the arm portions 372, 374 with an end portion 380 of the pin being positioned within an inwardly facing pin receiving opening 382 of the handle. The housing 32 in this example defines a biasing spring receiving chamber 390 within which a biasing spring 392 is positioned. In addition, in this example a second biasing spring 394 is positioned within the chamber 390, although fewer or more springs can be used. The handle arms 372, 374 can extend through the chamber 390. The respective arms 372, 374 desirably each have a recess therein for receiving the respective heads of the coupling pin 370.

A spring compression plate 400 (FIG. 11) is positioned within the housing and is slidable with the pin 350 as the pin is moved from the first locking position to the second unlocked position, and vice versa, as indicated by the double headed arrow 402. The pin 350 can have an annular shelf 404 which engages a first surface 406 of the compression plate 400 nearest to the bracket member 82. The springs 392, 394 can bear against a surface 412 of the spring compression plate opposite to the surface 406. The springs can be preloaded (when installed) to apply a biasing force against the surface 412 to urge the pin 350 toward the first locking position even when the handle 302 is released. A spring retaining feature, such as a projection or recess can be provided in the wall of the chamber 390 to engage one of the springs to assist in retaining the spring in the chamber. Such a spring retaining feature can be provided for each of the springs.

When the handle 302 is moved to the left in FIG. 11, the springs 392, 394 are compressed. This handle movement can be accomplished by a user pulling on the handle or by the end portion 314 of the accessory support arm engaging the end of the pin and pushing the pin out of the accessory arm receiving passageway. In response to this movement, the distal end 440 of the pin 350 is moved out of the opening 306 to a position in which the arm 24 is free to be removed from the mount. Upon releasing the handle 302, the springs bias the pin to its first or locked position. If opening 306 is not aligned with the pin, the accessory arm 24 can continue to be moved this alignment takes place and the pin is inserted into its first or locked position. As is apparent from the previous discussion, the end portion 314, and more specifically the tapered surface 312 thereof urges the pin 350 from its locked position to an unlocked position as the accessory arm is inserted deeper into the housing 27. Eventually the pin 350 becomes aligned with the opening 306 and the pin 350 moves under the biasing of the springs 392, 394 into its first or locked position.

Having illustrated and described a trailer with an accessory arm receiving mount in accordance with embodiments disclosed therein, it should be apparent to those of ordinary skill in the art can be modified in arrangement and detail without departing from the inventive principles disclosed herein. We claim all such modifications as fall within the following claims.

The invention claimed is:

1. A bicycle trailer comprising:
a trailer frame;
a bracket coupled to the trailer frame and projecting outwardly from the trailer frame, the bracket comprising a bracket passageway that extends in a front to rear direction along a side of the trailer frame;
a housing coupled to the bracket and thereby to the trailer frame;
the housing comprising a housing exterior and a housing passageway extending at least partially through the housing, the housing passageway communicating with the exterior of the housing through a locking insert receiving opening;
wherein the locking insert receiving opening, the housing passageway and the bracket passageway define a locking insert receiving passageway;
a locking insert positioned at least partially within the locking insert receiving passageway and extending at least partially through the bracket passageway and the housing passageway to thereby couple the housing to the bracket and to the trailer frame; and
the locking insert comprising an accessory arm receiving passageway communicating with the housing exterior through the locking insert receiving opening.

2. A bicycle trailer according to claim 1 wherein the trailer frame comprises a side frame member extending in a front to rear direction along a first side of the bicycle trailer;
the bracket comprises first and second bracket members coupled to the first side frame member and projecting outwardly from the first frame member, the first bracket member comprising a first bracket passageway and the second bracket member comprising a second bracket passageway;
a housing coupled to the first and second bracket members and thereby to the first side frame member;
wherein the housing comprises a housing exterior, a housing interior, a housing front, a housing rear and first and second housing sides, the housing comprising a locking insert receiving opening that communicates with the exterior of the housing and a housing passageway extending at least partially through the housing interior from the locking insert receiving opening;
wherein the first and second bracket passageways are aligned with one another and are aligned with the locking insert receiving opening and the housing passageway;
wherein the locking insert receiving opening, the housing passageway and the first and second bracket passageways together define a locking insert receiving passageway;
a locking insert positioned in the locking insert receiving passageway and extending at least partially through each of the first and second bracket passageways, and the housing passageway to couple the housing to the first and second bracket members and thereby to the first frame side member; and
the locking insert comprising an accessory arm receiving passageway communicating with the housing exterior through the locking insert receiving opening.

3. A bicycle trailer according to claim 2 wherein the locking insert comprises a locking sleeve comprising a locking sleeve body comprising a front portion positioned in the first bracket passageway, a central portion positioned between the first and second bracket passageways and a rear portion positioned in the second bracket passageway.

4. A bicycle trailer according to claim 2 wherein the locking insert comprises a first locking pin receiving opening positioned at a rear end portion of the locking insert, a first locking pin coupled to the housing and aligned with the first locking pin receiving opening, the locking pin being slidably coupled to the housing and movable between a first locking pin position in which the first locking pin extends through the first locking pin receiving opening into the accessory arm receiving passageway and a second locking pin position in which the first locking pin is withdrawn from the accessory arm receiving passageway, a spring coupled to the housing and to the first locking pin that biases the first locking pin to the first locking pin position, a handle coupled to the pin and slidably coupled to the housing, the handle being movable from a first handle position in which the first locking pin is in the first locking pin position to a second handle position in which the first locking pin is in the second locking pin position, the handle being coupled to the spring and biased by the spring to the first handle position, and wherein the second bracket member is located rearwardly of the first bracket member and wherein the first locking pin receiving opening extends through the second bracket member.

5. A bicycle trailer according to claim 2 wherein the side frame member comprises a first side member extending in a front to rear direction along a first side of the trailer, the trailer frame also comprising a second side frame member extending in a front to rear direction along a second side of the bicycle trailer opposite to the first side of the bicycle trailer, and wherein there is a second of the first and second bracket members coupled to the second side frame member, a second of said housings coupled to the first and second bracket members coupled to the second side frame member, and a second of said locking inserts coupling the second housing to said second of the first and second brackets and thereby to the second frame side member.

6. A bicycle trailer according to claim 1 wherein the locking insert comprises a locking sleeve comprising a front portion with a front end, wherein the locking sleeve front end has at least one cross sectional dimension that is greater than the cross sectional dimension of the locking insert receiving opening, the locking sleeve front end engaging the housing at the locking sleeve insert receiving opening to limit the depth of insertion of the locking sleeve body into the locking sleeve insert receiving passageway.

7. A bicycle trailer according to claim 6 wherein the locking sleeve has a lip surrounding the locking sleeve front end, the cross-sectional dimension of the locking sleeve at the lip being greater than the cross-sectional dimension of the locking insert receiving opening.

8. A bicycle trailer according to claim 6 wherein the locking sleeve comprises a rear end and a locking sleeve body, the locking sleeve further comprising at least one locking flange having a proximal end and a distal end, wherein the proximal end of the locking flange is pivoted to the locking sleeve body at a first location of the locking sleeve body, wherein the distal end of the locking flange projects outwardly from the first location and away from the rear portion of the locking sleeve body, the housing having at least one locking flange engaging projection extending inwardly into the locking insert receiving passageway and positioned to engage the locking sleeve flange and pivot the locking flange distal end inwardly as the locking sleeve body rear end is inserted into the locking sleeve first through the locking insert receiving opening and into the locking insert receiving passageway, the locking flange engaging projection having a front projection portion and a rear projection portion, the distal end of the locking flange being positioned rearwardly of the rear projection portion and pivoting outwardly rearwardly of the rear projection portion upon insertion of the locking sleeve insert to a location that positions the distal end of the locking flange rearwardly of the rear projection portion, the rear projection portion engaging the distal end of the locking flange to block the removal of the locking sleeve from the housing through the locking insert receiving opening.

9. A bicycle trailer according to claim 1 wherein the housing comprises a housing front and a housing rear, and wherein the housing passageway extends through the housing from the housing front to the housing rear, wherein the locking insert receiving opening is at the housing front, and wherein the locking sleeve extends approximately from the housing front to the housing rear.

10. A bicycle trailer according to claim 1 wherein the housing passageway, the bracket passageway, locking insert receiving passageway, and the accessory arm receiving passageway each have a rectangular cross section.

11. A bicycle trailer according to claim 10 further comprising an accessory supporting arm having a front arm end portion and a rear arm end portion, the rear arm end portion comprising a rear arm portion distal end, the rear arm end portion being sized for insertion into the accessory arm receiving passageway, the rear arm end portion having a pin engaging surface that converges toward the first locking pin moving from a first location to a second location along the rear portion of the accessory supporting arm, the first location being nearer to the rear arm portion distal end of the accessory supporting arm than the second location, the rear arm end portion having a first accessory arm pin receiving opening positioned further from the rear arm portion distal end of the accessory supporting arm than the second location, the first accessory arm pin receiving opening being located so as to be aligned with the first locking pin receiving opening at one position of insertion of the rear arm end portion into the accessory arm receiving passageway, wherein as the rear arm end portion is inserted into the accessory arm receiving passageway the pin engaging surface engages the first locking pin and a pushes the first locking pin against the force applied by a spring to the second locking pin position, and wherein at said one position of insertion of the rear arm end portion into the accessory arm receiving passageway, the spring biases the first locking pin to the first locking pin position, and wherein in the first locking pin position the first locking pin is biased by the spring into the first accessory arm pin receiving opening to thereby lock the accessory supporting arm to the housing.

12. A bicycle trailer according to claim 11 wherein the accessory supporting arm is rectangular with four sides and wherein one of said pin engaging surfaces and one of said first accessory arm pin receiving openings is located at each of the four sides of the accessory supporting arm.

13. A bicycle trailer according to claim 1 wherein the locking insert comprises a first locking pin receiving opening positioned at a rear end portion of the locking insert, a first locking pin coupled to the housing and aligned with the first locking pin receiving opening, the locking pin being slidably coupled to the housing and movable between a first locking pin position in which the first locking pin extends through the first locking pin receiving opening into the accessory arm receiving passageway and a second locking pin position in which the first locking pin is withdrawn from the accessory arm receiving passageway, a spring coupled to the housing and to the first locking pin that biases the first locking pin to the first locking pin position, a handle coupled to the pin and slidably coupled to the housing, the handle being movable from a first handle position in which the first locking pin is in the first locking pin position to a second handle position in which the first locking pin is in the second locking pin position, the handle being coupled to the spring and biased by the spring to the first handle position.

14. A bicycle trailer according to claim 1 wherein the bracket comprises first and second spaced apart discrete bracket members.

15. An accessory mount for coupling an accessory supporting arm to a bracket coupled to a portion of the frame of a bicycle trailer having a front and a rear, the bracket comprising a bracket passageway, the accessory mount comprising:

a housing coupled to the bracket and thereby to the frame;
wherein the housing comprises a housing exterior, a housing interior, a housing front, a housing rear and first and second housing sides, the housing comprising a locking insert receiving opening that communicates with the exterior of the housing and a housing passageway extending at least partially through the housing interior from the locking insert receiving opening and in a housing front to housing rear direction;
wherein the bracket passageway is aligned with the locking insert receiving opening and the housing passageway;
wherein the locking insert receiving opening, the housing passageway and the bracket passageway together define a locking insert receiving passageway;
a locking insert positioned in the locking insert receiving passageway and extending at least partially through the bracket passageway, and the housing passageway, wherein the locking insert couples the housing to the bracket and thereby to the frame; and
the locking insert comprising an accessory arm receiving passageway communicating with the housing exterior through the locking insert receiving opening.

16. An accessory mount according to claim 15 wherein the bracket comprises first and second bracket members with respective first and second bracket passageways, and wherein the housing comprises first and second bracket receiving openings, wherein a portion of the first bracket extends through the first bracket receiving opening and a portion of the second bracket extends through the second bracket receiving opening, wherein the first and second bracket passageways are positioned within the interior of the housing.

17. An accessory mount according to claim 15 wherein the bracket comprises first and second bracket members with respective passageways, and wherein the housing comprises first and second bracket receiving openings communicating with the interior of the housing through one of the first and second housing sides, wherein first bracket receiving opening is sized for insertion of at least a portion of the first bracket therethrough to position the first bracket opening within the housing interior, wherein the second bracket receiving opening is sized for insertion of at least a portion of the second bracket therethrough to position the second bracket opening within the housing interior.

18. An accessory mount according to claim 15 wherein the locking insert comprises a locking sleeve comprising a locking sleeve body comprising a front portion positioned in the first bracket passageway, a central portion positioned between the first and second bracket passageways and a rear portion positioned in the second bracket passageway.

19. An accessory mount according to claim 18 wherein the locking sleeve front portion has a front end and the locking sleeve rear portion has a rear end, the locking sleeve front end has at least one cross sectional dimension that is greater than the cross sectional dimension of the locking insert receiving opening, the locking sleeve front end engaging the housing at the locking sleeve receiving opening to limit the depth of insertion of the locking sleeve body into the accessory arm receiving passageway.

20. An accessory mount according to claim 18 wherein the housing passageway extends through the housing from the housing front to the housing rear, wherein the housing front faces toward the front of the trailer, and wherein the locking insert receiving opening is at the housing front, and wherein the locking sleeve extends approximately from the housing front to the housing rear, and wherein the locking sleeve has a lip surrounding the locking sleeve front end, the cross sectional dimension of the locking sleeve at the lip being greater than the cross sectional dimension of the locking insert receiving opening.

21. An accessory mount according to claim 15 wherein the locking insert comprises a locking insert body, the locking insert body comprising a locking insert body front end and a locking insert body rear end, at least one locking flange having a proximal end and a distal end, wherein the proximal end of the locking flange is pivoted to the locking insert body at a first location of the locking insert body, wherein the distal end of the locking flange projects outwardly from the first location and away from the rear portion of the locking insert body, the housing having at least one locking flange engaging projection extending inwardly toward the locking insert receiving passageway and positioned to engage the locking flange and pivot the locking flange distal end inwardly as the locking insert body rear end is inserted first through the locking insert receiving opening and into the locking insert receiving passageway, the locking flange engaging projection having a front projection portion and a rear projection portion, the distal end of the locking flange being positioned rearwardly of the rear projection portion and pivoting outwardly rearwardly of the rear projection portion upon insertion of the locking insert to a location that positions the distal end of the locking flange rearwardly of the rear projection portion, the rear projection portion engaging the distal end of the locking flange to block the removal of the locking insert from the housing through the locking insert receiving opening.

22. An accessory mount according to claim 15 wherein the locking insert comprises a first locking pin receiving opening positioned at a rear end portion of the locking insert, a first locking pin coupled to the housing and aligned with the first locking pin receiving opening, the locking pin being slidably coupled to the housing and movable between a first locking pin position in which the first locking pin extends through the first locking pin receiving opening into the accessory arm receiving passageway and a second locking pin position in which the first locking pin withdrawn from the accessory arm receiving passageway, a spring coupled to the housing and to the first locking pin that biases the first locking pin to the first locking pin position, a handle coupled to the pin and slidably coupled to the housing, the handle being movable from a first handle position in which the first locking pin is in the first locking pin position to a second handle position in which the first locking pin is in the second locking pin position, the handle being coupled to the spring and biased by the spring to the first handle position.

23. An accessory mount according to claim 22 further comprising an accessory supporting arm having a front arm end portion and a rear arm end portion, the rear arm end portion comprising a rear arm portion distal end, the rear arm end portion being sized for insertion into the accessory arm receiving passageway, the rear arm end portion having a pin engaging surface that converges toward the first locking pin moving from a first location to a second location along the rear portion of the accessory supporting arm, the first location being nearer to the rear arm portion distal end of the accessory supporting arm than the second location, the rear arm end portion having a first accessory arm pin receiving opening positioned further from the rear arm portion distal end of the accessory supporting arm than the second location, the first accessory arm pin receiving opening being located so as to be aligned with the first locking pin receiving opening at one position of insertion of the rear arm end portion into the accessory arm receiving passageway, wherein as the rear arm end portion is inserted into the accessory arm receiving passageway the pin engaging surface engages the first locking pin and pushes the first locking pin against the force applied by the spring to the second locking pin position, and wherein at said one position of insertion of the rear arm end portion into the accessory arm receiving passageway, the spring biases the first locking pin to the first locking pin position, and wherein in the first locking pin position the first locking pin is biased by the spring into the first accessory arm pin receiving opening to thereby lock the accessory supporting arm to the housing; and wherein the housing passageway, the bracket passageway, the locking sleeve and the accessory arm receiving passageway each have a rectangular cross section, and wherein the accessory supporting arm is rectangular with four sides and wherein one of said pin engaging surfaces and one of said first accessory arm pin receiving openings is located at each of the four sides of the accessory supporting arm.

24. An accessory mount according to claim 22 wherein the bracket comprises first and second bracket members with respective first and second bracket passageways, the second bracket member being positioned rearwardly of the first bracket member and wherein the first locking pin receiving opening extends through a portion of the second bracket member.

25. An accessory mount according to claim 15 wherein the bracket comprises first and second spaced apart discrete bracket members coupled to a side frame member of the bicycle trailer.

26. An accessory mount for coupling an accessory supporting arm to first and second brackets coupled to a side member of the frame of a bicycle trailer having a front and a rear, the first bracket comprising a first bracket passageway and the second bracket comprising a second bracket passageway, the first and second bracket passageways being aligned in a front to rear direction along the frame side member, and the second bracket being positioned on the side member of the frame of the bicycle rearwardly of the first bracket, the accessory mount comprising:

a housing having a housing exterior, a housing interior, a housing front, a housing rear and first and second housing sides, the housing comprising a locking insert receiving opening that communicates with the exterior of the housing and a housing passageway extending at least partially through the housing interior from the locking insert receiving opening and in a housing front to housing rear direction, the housing comprising first and second bracket receiving openings communicating with the interior of the housing through one of the first and second housing sides, wherein the first bracket receiving opening is sized for insertion of at least a portion of the first bracket therethrough to position the first bracket opening within the housing interior, wherein the second bracket receiving opening is sized for insertion of at least a portion of the second bracket therethrough to position the second bracket receiving opening within the housing interior, wherein the housing passageway and the first and second bracket passageways are aligned with one another and with the locking insert receiving opening and together define a locking insert receiving passageway;

a locking insert positioned in the locking insert receiving passageway and extending through the first bracket passageway, the housing passageway and at least partially through the second bracket passageway, wherein the locking insert couples the housing to the first and second brackets and thereby to the first frame side member;

the locking insert having an accessory arm receiving passageway communicating with the housing exterior through the locking insert receiving opening;

wherein the locking insert comprises a locking sleeve comprising a locking sleeve body comprising a front portion positioned in the first bracket passageway, a central portion positioned between the first and second bracket passageways and a rear portion positioned in the second bracket passageway;

wherein the housing passageway extends through the housing from the housing front to the housing rear, wherein the housing front faces toward the front of the trailer, and wherein the locking insert receiving opening is at the housing front, and wherein the locking sleeve extends approximately from the housing front to the housing rear, and wherein the locking sleeve has a lip surrounding the locking sleeve front end, the cross sectional dimension of the locking sleeve at the lip being greater than the cross sectional dimension of the locking insert receiving opening;

wherein the locking sleeve comprises at least one locking flange having a proximal end and a distal end, wherein the proximal end of the locking flange is pivoted to the locking sleeve body at a first location of the locking sleeve body, wherein the distal end of the locking flange projects outwardly from the first location and away from the rear portion of the locking sleeve body, the housing having at least one locking flange engaging projection extending inwardly toward the locking insert receiving passageway and positioned to engage the locking sleeve flange and pivot the locking flange distal end inwardly as the locking sleeve body is inserted locking sleeve rear end first through the locking insert receiving opening and into the locking insert receiving passageway, the locking flange engaging projection having a front projection portion and a rear projection portion, the distal end of the locking flange being positioned rearwardly of the rear projection portion and pivoting outwardly rearwardly of the rear projection portion upon insertion of the locking sleeve insert to a location that positions the distal end of the locking flange rearwardly of the rear projection portion, the rear projection portion engaging the distal end of the locking flange to block the removal of the locking sleeve from the housing through the locking insert receiving opening;

wherein the locking insert comprises a first locking pin receiving opening positioned at a rear end portion of the locking insert, a first locking pin coupled to the housing and aligned with the first locking pin receiving opening, the locking pin being slidably coupled to the housing and movable between a first locking pin position in which the first locking pin extends through the first locking pin receiving opening into the accessory arm receiving passageway and a second locking pin position in which the first locking pin it withdrawn from the accessory arm receiving passageway, a spring coupled to the housing and to the first locking pin that biases the first locking pin to the first locking pin position, a handle coupled to the pin and slidably coupled to the housing, the handle being movable from a first handle position in which the first locking pin is in the first locking pin position to a second handle position in which the first locking pin is in the second locking pin position, the handle being coupled to the spring and biased by the spring to the first handle position; and wherein the first locking pin receiving opening extends through a portion of the second bracket member.

* * * * *